United States Patent [19]
Laakmann

[11] Patent Number: 5,793,477
[45] Date of Patent: Aug. 11, 1998

[54] LASER SPEED MONITOR DISABLING SYSTEM

[75] Inventor: Peter Laakmann, Mukilteo, Wash.

[73] Assignee: Lidatek, LLC, Mukilteo, Wash.

[21] Appl. No.: 679,641

[22] Filed: Jul. 12, 1996

Related U.S. Application Data

[63] Continuation-in-part of Ser. No. 566,646, Dec. 4, 1995.
[51] Int. Cl.[6] ............... G01P 3/36; G01S 7/36; B60T 7/16
[52] U.S. Cl. ............... 356/28; 342/14; 180/167; 356/28.5
[58] Field of Search ............... 356/28, 28.5, 5.01; 342/13, 14

[56] References Cited

U.S. PATENT DOCUMENTS

| | | |
|---|---|---|
| 3,978,342 | 8/1976 | Hagen et al. |
| 4,072,949 | 2/1978 | Van Brunt |
| 5,359,404 | 10/1994 | Dunne |
| 5,406,287 | 4/1995 | Pinkus |

FOREIGN PATENT DOCUMENTS

| 2408058 | 8/1975 | Germany |
|---|---|---|

OTHER PUBLICATIONS

D. Schroeder; Car & Driver; Nov. 1993, pp. 124–131.
P. Bedard; Car & Driver; pp. 87–92, Apr. 1992.
B. Keirstead et al; J. of Electronic Defense; vol. 15, No. 5, May 1992.

Samuels, M. et al., "Low Cost, Handheld Lidar System for Automotive Speed Detection and Law Enforcement," *SPIE vol. 1633 Laser Radar VII*, 1992, pp. 147–159.

Miloni, Peter W. and Joseph H. Eberly., "Some Laser Applications," *Lasers*, John Wiley & Sons, New York, 1988, pp. 585–589.

Liao, Samuel, Y., "Microstrip Lines and Optical Fibers," *Microwave Devices and Circuits*, 2d ed., Prentice–Hall, Inc., Englewood Cliffs, N. J., 1985, pp. 467–480.

*Primary Examiner*—Stephen C. Buczinski
*Attorney, Agent, or Firm*—Seed and Berry LLP

[57] ABSTRACT

A disabling system for disabling a laser-based speed monitor of the type that transmits a monitor laser beam at a moving motor vehicle. The monitor laser beam transmitted by the speed monitor is detected when it arrives at the motor vehicle. In response to detecting the monitor laser beam, a warning is output by an annunciator to the motor vehicle driver and a jamming laser beam is transmitted toward the speed monitor. The jamming laser beam disables the speed monitor for a time period sufficient to allow the motor vehicle driver to reduce the speed of the motor vehicle. The jamming laser beam is transmitted by a laser transponder structured to be powered only by the vehicle battery. Plural laser transponders are coupled to a single annunciator to provide plural points of speed monitor detection and jamming without requiring plural annunciators.

28 Claims, 13 Drawing Sheets

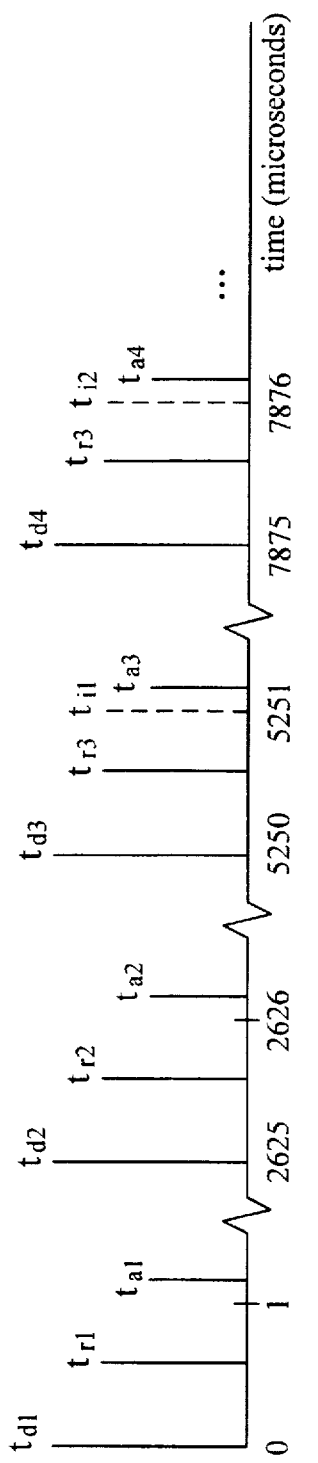
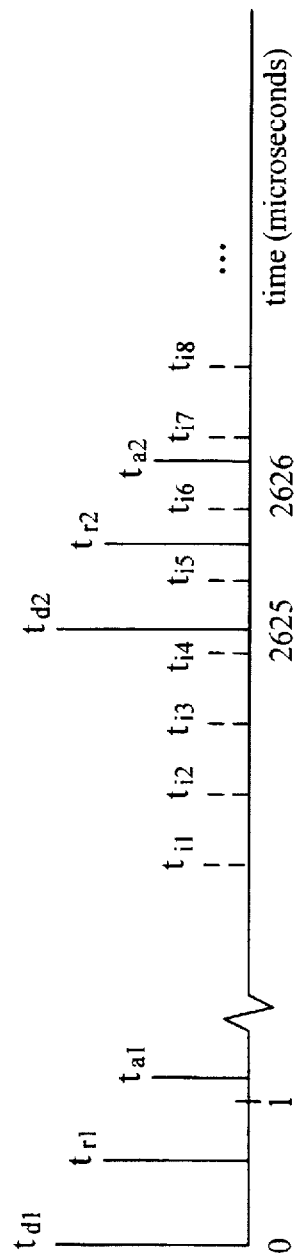
Fig. 1 (Prior Art)
Fig. 2

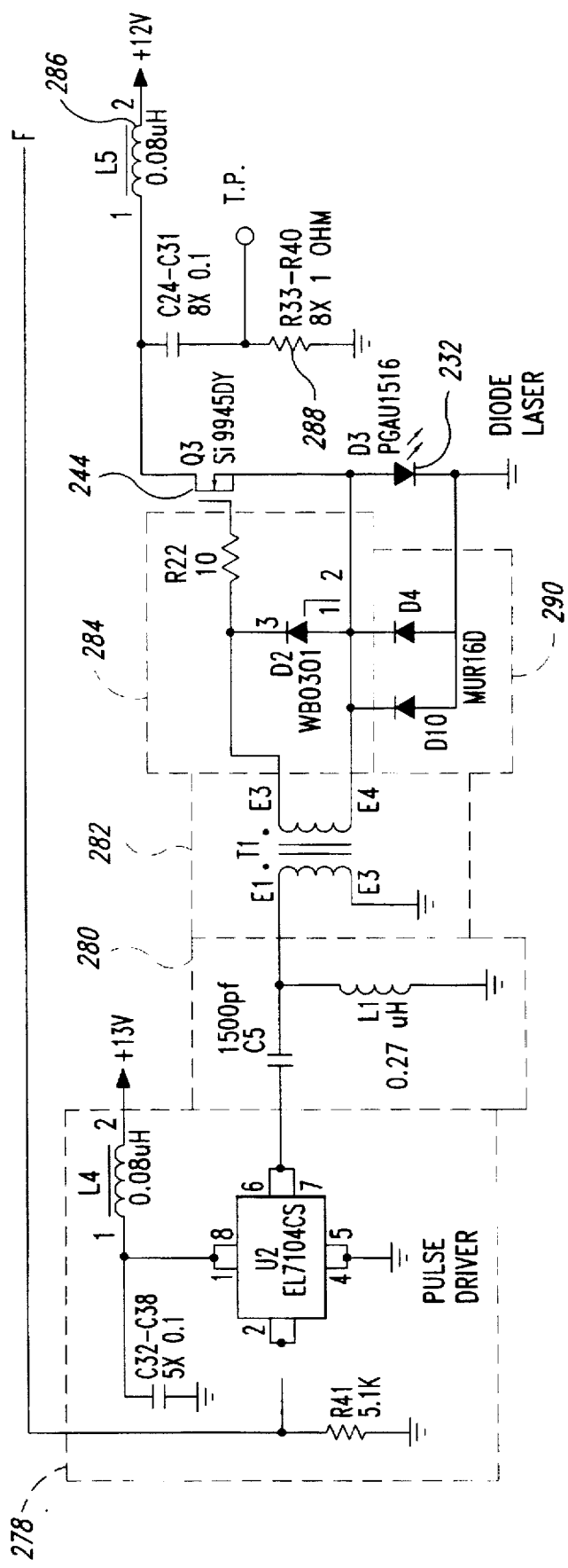

LASER SPEED MONITOR DISABLING SYSTEM

CROSS-REFERENCE TO RELATED APPLICATION

This application is a continuation-in-part of U.S. patent application Ser. No. 08/566,646, filed Dec. 4, 1995, now pending.

TECHNICAL FIELD

The present invention relates to lasers and, more particularly, to disabling systems that temporarily disable laser-based speed monitors known as lidar velocity monitors.

BACKGROUND OF THE INVENTION

Police departments traditionally have employed radar speed monitors to monitor the velocities of motor vehicles. Such radar speed monitors transmit radio waves at a moving motor vehicle and receive the waves reflected back from the motor vehicle. The speed of the motor vehicle is calculated by determining the difference in time that it takes successive radio waves to return to the radar speed monitor from the motor vehicle. The radio waves transmitted by such radar speed monitors are dispersed over a large area, which causes the radio waves to be reflected off of numerous objects other than or in addition to the motor vehicle. Such reflections cause the radar speed monitor to detect false speed readings and enable the radar speed monitor to be detected by a radar detector at a significant range before the speed of the motor vehicle can be monitored.

In recent years, the radar speed monitor has been replaced by a speed monitor known as a lidar speed monitor. A lidar speed monitor operates similar to a radar speed monitor except that the lidar speed monitor reflects a laser beam, rather than radio waves, off of the motor vehicle. Such a laser beam is much more narrow than the radio waves transmitted by the radar speed monitor, which results in a lidar speed monitor that is much more accurate and less detectable than radar speed monitors. The increased accuracy and reduced detectability arises because the narrow laser beam is not usually reflected off objects other than a small part of the motor vehicle being monitored.

A typical lidar speed monitor transmits a monitor laser beam at a carrier frequency of $3.315 \times 10^{14}$ Hz (905 nM in wavelength). The monitor laser beam typically includes a series of pulses at a pulse repetition frequency of 380 Hz with each pulse having a pulse width of approximately 20 nanoseconds and a peak power of 50 watts. The lidar speed monitor computes the range of the vehicle from the lidar speed monitor by determining how long it takes for a pulse to travel to the vehicle and back to the lidar speed monitor and multiplies that time by the speed of light. The lidar speed monitor computes the speed of the vehicle by calculating several sequential range measurements within a predetermined time period and dividing the difference between range measurements by the time period. In current lidar devices, approximately 100 pulses are used to compute an average speed for a vehicle within an accuracy of approximately 1 mph. Given that approximately 380 pulses are transmitted each second, the current lidar devices can determine speed in as little as ⅓ of a second. With so little time, a vehicle driver is unable to slow down quickly enough to avoid detection even if the monitor laser beam from the lidar were detected instantaneously.

Some have proposed overcoming the lidar speed monitors by actively disabling them long enough for the vehicle to slow down. Such proposals involve transmitting a jamming laser beam from the vehicle to the lidar speed monitor in a manner that completely disables the lidar speed monitor or causes the lidar speed monitor to calculate false speed readings. Proposed lidar jammers would operate by transmitting in the jamming laser beam a pulse train having a pulse repetition frequency that matches the pulse repetition frequency of the monitor laser beam transmitted by the lidar speed monitor. Each pulse of the pulse train is transmitted so that it arrives at the lidar speed monitor sometime within the time period beginning when the lidar speed monitor transmits a pulse and ends when the lidar speed monitor receives the pulse reflected off the vehicle. The lidar speed monitor accepts only the first laser beam pulse received after a pulse of the monitor laser beam is transmitted, so each pulse of the jamming laser beam causes the lidar speed monitor to consider the jamming laser beam pulse to be the pulse reflected off the vehicle. As a result, the lidar speed monitor computes a false speed based on the jamming laser beam pulses rather than the pulses reflected off the vehicle.

FIG. 1 is a timing diagram that shows how such prior art lidar jammers operate. At time $t_{d1}$ (0 seconds), the lidar speed monitor transmits the monitor laser beam with a laser pulse at a motor vehicle equipped with the lidar jammer. If the vehicle is 500 feet from the lidar speed monitor, then the laser pulse will be reflected off of the vehicle in approximately 0.51 microseconds ($t_{r1}$) and the reflected laser pulse will return to the lidar speed monitor after 1.16 microseconds ($t_{a1}$). Assuming that the pulse repetition frequency of the lidar speed monitor is 380 pulses per second, the lidar speed monitor transmits a second pulse at time $t_{d2}$, 2625 microseconds after the first pulse was transmitted at time $t_{d1}$. After the second pulse arrives at the vehicle at time $t_{r2}$, the lidar jammer on the vehicle can compute the pulse repetition frequency of the lidar speed monitor. Typically, the laser jammers wait to receive several pulses from the lidar speed monitor so that a more accurate determination of the pulse repetition frequency of the lidar speed monitor can be obtained. However, for the purposes of this example, it can be assumed that the pulse repetition frequency of the lidar speed monitor is determined after only two pulses. Based on the lidar jammer's determination of the pulse repetition frequency of the lidar speed monitor, the lidar jammer determines that the lidar speed monitor will transmit a pulse every 2625 microseconds beginning 5250 microseconds after the first pulse $t_{d1}$ was transmitted.

The proposed lidar jammer would attempt to create false speed readings by transmitting a pulse train having a pulse repetition frequency that matches the pulse repetition frequency of the typical lidar speed monitor (380 pulses per second) and always arrives ahead of the reflected signal. The proposed lidar jammer would transmit the first pulse of the pulse train so that it arrives at the lidar speed monitor at time $t_{i1}$ before the third pulse transmitted by the lidar speed monitor is expected to return to the lidar speed monitor at time $t_{a3}$. The lidar speed monitor would compute a range based on the time difference between sending the third pulse at time $t_{d3}$ and receiving the first inserted pulse at time $t_{i1}$, which is a shorter range than was computed based on the time difference between sending the second pulse at time $t_{d2}$ and receiving the second reflected pulse at time $t_{a2}$. The proposed lidar jammer would attempt to vary the pulse spacing to create "out of range" speed readings that would disable the lidar speed monitor.

Such proposed lidar jammers would be deficient for several reasons. First, the proposed lidar jammer must measure the pulse repetition frequency of the monitor laser beam transmitted by the lidar speed monitor with very high accuracy, which requires expensive components and is prone to error. Second, the lidar jammer must transmit in the jamming laser beam a pulse train having a pulse repetition frequency that accurately matches the pulse repetition frequency of the monitor laser beam of the lidar speed monitor. Third, even if it were possible to accurately measure and match the pulse repetition frequency of the monitor laser beam, such lidar jammers can be defeated simply by adjusting the lidar speed monitor to transmit a pulse train having an unstable, random, or programmed pulse repetition rate.

In addition to the technical feasibility problems discussed above, several practical problems would still exist. In particular, such a lidar jammer likely would include a high-powered laser diode, such as a gallium arsenide laser diode, to transmit the short pulses (e.g., 15 nanoseconds) of the jamming laser beam at the lidar speed monitor. Such high-powered laser diodes normally are operated with high voltage power supplies (e.g., 40 to 200 volts) in order to overcome the inductive voltage drops in the circuit driving the laser diode as well as the intrinsic inductance of the laser diode. However, a typical motor vehicle includes only a 12 volt nominal battery which would be insufficient to power the high-powered laser diodes using prior art driver circuits.

In addition, in order to be effective, such lidar jammers would need to be positioned near the location on the vehicle at which the monitor laser beam is being directed by the lidar speed monitor, such as the vehicle license plate. Also, it would be desirable to have an annunciator within the vehicle to provide a visual and/or audio warning that a lidar speed monitor has been detected in order to enable the vehicle driver to reduce the speed of the vehicle. Accordingly, some connection would be necessary between the annunciator within the vehicle and the lidar jammer positioned on the outside of the vehicle. It would be desirable to be able to periodically test such a connection to ensure that the annunciator is properly connected to the lidar jammer.

SUMMARY OF THE INVENTION

The invention is directed to a system for disabling a laser-based speed monitor of the type that transmits a monitor laser beam at a moving object, such as a motor vehicle. The disabling system includes a laser detector that detects when the monitor laser beam transmitted by the speed monitor arrives at the motor vehicle. In response to detecting the monitor laser beam, a laser transmitter of the disabling system transmits a jamming laser beam to the speed monitor. The jamming laser beam preferably includes a plurality of pulses separated from each other by a time period that is less than or equal to an amount of time needed for the monitor laser beam to travel from the speed monitor to the moving object and back to the speed monitor. While jamming the speed monitor with the jamming laser beam, an annunciator outputs a warning to a user of the motor vehicle so that the user can reduce the speed of the motor vehicle.

Preferably, the disabling system includes a drive circuit coupled to a vehicle battery having a voltage of approximately 18 volts or less. The drive circuit also is coupled to the laser detector and the laser transmitter in a manner that supplies electrical power from the vehicle battery to the laser transmitter in response to receiving from the laser detector a detection signal that indicates that the monitor laser beam was detected. The drive circuit preferably has a drive inductance that, when added to the laser transmitter inductance, is sufficiently small to enable the drive circuit to supply a laser transmitter with electrical power from the vehicle battery sufficient to cause the laser transmitter to transmit the jamming laser beam to the speed monitor.

In the preferred embodiment, the drive circuit includes a microstrip transmission line through which the laser transmitter is driven. The microstrip transmission line has a characteristic impedance substantially matching the load impedance of the laser transmitter in order to limit power reflections. The microstrip transmission line includes a dielectric substrate coupled between a ground plane and a strip conductor that extends substantially across a face of the dielectric substrate in order to limit the impedance of the microstrip transmission line without unduly enlarging its size. Surface mounted on the microstrip transmission line is a plurality of power transistors of a pulse driver circuit that activates the laser transmitter via the microstrip transmission line. Using a plurality of power transistors without a heat sink further reduces the inductance of the drive circuit when compared with a typical power transistor that employs a heat sink.

The laser transmitter, laser detector, and drive circuit are part of a laser transponder that is mounted on the outside of the motor vehicle at a location that would be targeted by the laser speed monitor. The laser transponder is connected to an annunciator that provides a speed monitor warning to a user in response to sensing that the laser transponder is transmitting the jamming laser beam. Preferably, the annunciator supplies power from the vehicle battery to the laser transponder via a connection line. In addition, the annunciator includes a current sensor that senses the electrical current on the connection line and provides the speed monitor warning when the electrical current on the connection line indicates that the laser transponder is transmitting the jamming laser beam. The laser transponder preferably includes a test element, such as a thermistor, that triggers the annunciator into temporarily providing the speed monitor warning in response to initially supplying power to the laser transponder and causes the annunciator to turn off the speed monitor warning after an initial time period has elapsed. By triggering the annunciator into temporarily providing the speed monitor warning when the laser transponder is initially turned on, the test element provides an indication of the integrity of the connection line connecting the laser transponder to the annunciator.

The disabling system may include a plurality of laser transponders each connected to the single annunciator so that the laser transponders can detect the monitor laser beam and transmit a jamming laser beam from various locations on the vehicle.

BRIEF DESCRIPTION OF THE DRAWINGS

FIG. 1 is a timing diagram showing the laser beam pulses transmitted by prior art lidar detectors.

FIG. 2 is a timing diagram showing the pulses of the jamming laser beam transmitted according to the present invention.

FIGS. 9A–9C together are a circuit diagram depicting a preferred embodiment of a laser transponder of the disabling system shown in FIG. 6.

DETAILED DESCRIPTION OF THE INVENTION

Figure 3:
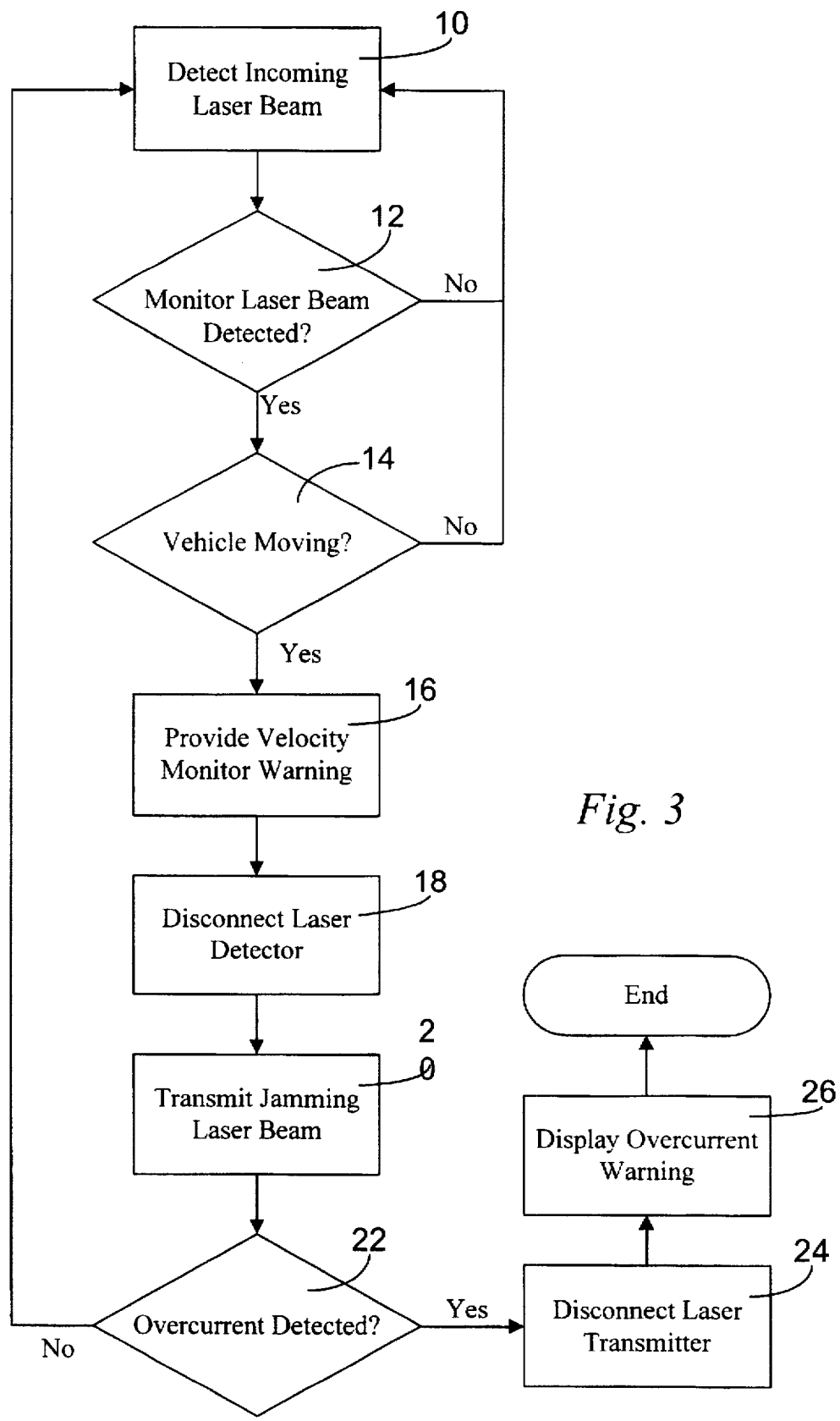
FIG. 3 is a flow diagram showing a method for temporarily disabling a speed monitor according to the present invention.

The invention is directed to a speed monitor disabling system for disabling a laser-based speed monitor, known as a lidar speed monitor, that is attempting to determine the speed of a moving object, such as a motor vehicle. The disabling system of the invention disables the lidar speed monitor by transmitting to the lidar speed monitor a jamming laser beam that includes a pulse train having a high pulse repetition frequency. The pulse repetition frequency of the pulse train transmitted according to the invention is sufficiently high to ensure that a pulse from the pulse train always reaches the lidar speed monitor before a pulse transmitted by the lidar speed monitor can be reflected off the motor vehicle and back to the lidar speed monitor. The disabling system preferably is structured such that the laser transmitter is powered by a conventional low voltage vehicle battery without employing any expensive, high voltage power sources.

The lidar speed monitor is disabled with the jamming laser beam without attempting to match the pulse repetition frequency of the monitor laser beam transmitted by the lidar speed monitor. A lidar speed monitor typically determines the speed of a motor vehicle between approximately 500 and 1500 feet from the motor vehicle. The speed of the monitor laser beam used to interrogate the motor vehicle is the speed of light (i.e., $9.836 \times 10^8$ feet per second). As a result, at a distance of 500 feet, the monitor laser beam has a round trip flight time of approximately 1.16 microseconds and at 1500 feet, the round trip flight time is approximately 3.48 microseconds. Thus, by transmitting in the jamming laser beam a pulse train with a constant pulse repetition frequency of approximately 0.86 MHz or greater (1/1.16 microseconds), the invention ensures that a pulse will always arrive at the lidar speed monitor before a pulse in the monitor laser beam can make the 1.16 microsecond round trip between the lidar speed monitor and the vehicle. In other words, the pulse repetition frequency of the jamming laser beam should be greater than or equal to the speed of the monitor laser beam (light speed) divided by the quantity of two times a preselected minimum distance between the lidar speed monitor and the motor vehicle (round trip distance). Although 0.86 MHz is sufficient to disable the lidar speed monitor at 500 feet, the invention preferably employs a pulse train with a pulse repetition frequency of 2 MHz to ensure that the lidar speed monitor can be disabled when the lidar speed monitor is only 250 feet from the motor vehicle.

The invention can be understood more clearly with respect to the timing diagram shown in FIG. 2. The lidar speed monitor transmits a monitor laser beam with a first pulse at time $t_{t1}$. The first pulse of the monitor laser beam is reflected off the motor vehicle at time $t_{r1}$ and the reflected first pulse is detected at the lidar speed monitor at time $t_{a1}$. Assuming that the motor vehicle is 500 feet from the lidar speed monitor, the monitor laser beam takes approximately 1.16 microseconds to travel to the motor vehicle and back to the lidar speed monitor at time $t_{a1}$. Instead of trying to determine and match the pulse repetition frequency of the monitor laser beam like prior art lidar jammers, the present invention simply transmits a pulse train with a high, constant pulse repetition frequency with each pulse of the pulse train being indicated by a dashed line in FIG. 2. In the example shown in FIG. 2, the pulse repetition frequency of the inserted pulse train is 2 MHz (two million pulses per second), which ensures that at least one pulse of the pulse train arrives at the speed monitor before a pulse transmitted by the speed monitor can be reflected off of the vehicle back to the speed monitor when the speed monitor is 250 feet or more away from the vehicle. For example, the fifth inserted pulse of the pulse train arrives at the lidar speed monitor at time $t_{i5}$, which is well before a reflected second pulse of the monitor laser beam returns to the lidar speed monitor at time $t_{a2}$. It will be appreciated that the first inserted pulse arriving at the lidar speed monitor need not be the fifth inserted pulse of the jamming laser beam and instead could be any of the inserted pulses of the jamming laser beam.

A flowchart of the method employed by the disabling system to disable the lidar speed monitor according to the present invention is shown in FIG. 3. In step 10 the method detects an incoming laser beam. In step 12 the method determines whether the incoming laser beam detected corresponds to a typical monitor laser beam from a lidar speed monitor. Step 12 is used to make sure that a laser beam from a source other than a lidar speed monitor does not trigger the transmission of a jamming laser beam. For example, if step 12 is not performed, then a jamming laser beam from a lidar jammer on another motor vehicle could trigger transmission of an unnecessary jamming laser beam. Therefore, if the laser beam detected does not correspond to a monitor laser beam from a typical lidar speed monitor, then the method returns to step 10 for the detection of another laser beam.

If the incoming laser beam detected is determined to be a monitor laser beam in step 12, then the method determines whether the motor vehicle is moving in step 14. If the motor vehicle is not moving, then the method returns to step 10 to detect another laser beam without transmitting a jamming laser beam. If step 14 is not included, then a lidar speed monitor could trigger a transmission of jamming laser beam from a parked car. Thus, step 14 reduces the possibility of eye damage to pedestrians walking in front of the parked car. Alternatively, step 14 could determine whether the engine of the motor vehicle was running at greater than a threshold number of revolutions per minute (RPMs). In addition, step 14 could determine whether the engine of the motor vehicle was running based on the voltage of the motor vehicle's battery.

If step 14 determines that the motor vehicle is moving, then the method provides a lidar speed monitor warning to the motor vehicle driver in step 16. The lidar speed monitor warning can be an audible warning, a visual warning, or a combination of such warnings. The warning can last for several seconds or can simply be a short burst of sound or light sufficient to indicate to the motor vehicle driver that the monitor laser beam from a lidar speed monitor has been detected.

During the provision of the lidar speed monitor warning in step 16, the method disconnects the laser detector in step 18. Further, in step 20 the method transmits the jamming laser beam to the lidar speed monitor. Disconnecting the laser detector in step 18 ensures that the jamming laser beam transmitted in step 20 does not retrigger the timer that triggers the generation of the jamming laser beam. Alternatively, one could employ a timer having a retrigger capability that is automatically disabled for some time after the timer triggers the generation of the jamming laser beam. As discussed above, the jamming laser beam includes a pulse train having a constant pulse repetition frequency sufficient to ensure that a pulse always reaches the lidar speed monitor before a pulse transmitted by the lidar speed monitor is reflected back to the lidar speed monitor (e.g. 2 MHz).

The invention preferably transmits the jamming laser beam in step 20 only for a sufficient period of time to enable the motor vehicle driver to reduce the speed of the motor vehicle (e.g., 5–10 seconds). Limiting the duration of the jamming laser beam transmission reduces the possibility of injury to pedestrians in the path of the jamming laser beam. In addition, limiting the duration of the jamming laser beam transmission reduces the load on the laser transmitter and enables the use of a less expensive laser transmitter.

In step 22 the method determines whether an overcurrent condition has occurred. Such an overcurrent condition could result if the circuitry causing the jamming laser beam to be transmitted does not turn off the laser beam transmission after the predetermined time period provided to enable the motor vehicle driver to reduce the speed of the motor vehicle. Alternatively, the overcurrent condition could be caused by repeated retriggering of the laser transmitter with successive pulses. If an overcurrent condition is detected in step 22, then the method disconnects the laser transmitter from its power source in step 24. In addition, the method displays an overcurrent warning to the motor vehicle driver in step 26. If no overcurrent condition is detected, then the method simply returns to step 10 for detection of another monitor laser beam.

Figure 4:
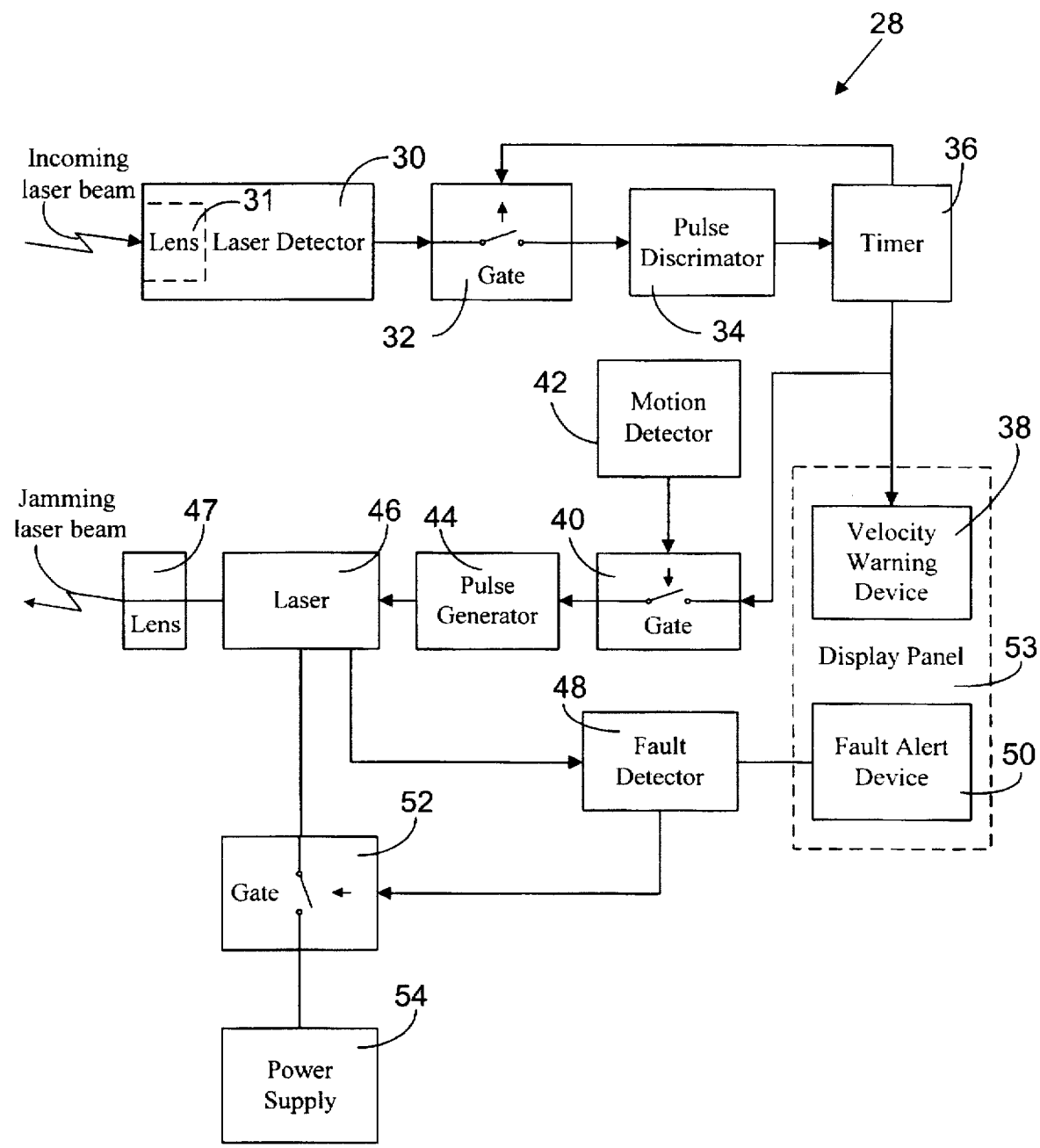
FIG. 4 is a block diagram of a laser transponder for temporarily disabling a speed monitor according to the present invention.

A laser transponder 28 for disabling the lidar speed monitor is shown in FIG. 4. The laser transponder 28 includes a laser detector 30 that detects the monitor laser beam transmitted by the lidar speed monitor. The optical divergence angle of the monitor laser beam typically is approximately 4 milliradians which gives the monitor laser beam a 2 foot cross-sectional radius at a range of 1000 feet. The primary target of the speed monitor is the motor vehicle license plate because the license plate is coated with a retro-reflective paint that results in the best reflection from typical motor vehicles. As a result, to detect the monitor laser beam, the laser detector 30 should be positioned on or immediately adjacent the motor vehicle license plate. In addition, the laser detector preferably includes a lens 31 with a relatively narrow optical acceptance angle (e.g., 20°) in order to maximize the monitor laser beam signal received by the laser detector 30.

In response to detecting the monitor laser beam from the speed monitor, the laser detector 30 outputs a detection signal. The laser transponder 28 includes a gate 32 and a pulse discriminator 34. The gate 32 is normally closed so that the detection signal from the laser detector 30 is passed on to the pulse discriminator 34. The pulse discriminator 34 determines whether the incoming laser beam detected by the laser detector 30 matches the monitor laser beam that is typically output by lidar speed monitors. If the pulse discriminator 34 determines that the incoming laser beam is a monitor laser beam, then the pulse discriminator passes the detection signal to a timer 36.

In response to the detection signal, the timer 36 transmits a timing pulse to three components of the laser transponder 28: the gate 32, a speed warning device 38, and a motion detector gate 40. The timing pulse opens the gate 32 so that the laser detector 30 is disconnected from the remainder of the laser transponder 28. As discussed above, the disconnection of the laser detector 30 prevents retriggering of the jamming laser beam by reflected pulses of the laser transponder 28. In response to the timing pulse, the speed warning device 38 outputs a visual and/or audible warning to the motor vehicle driver in order to allow the driver to reduce the speed of the motor vehicle. Preferably, the timing pulse is sufficiently long (e.g., 10 seconds) to enable the motor vehicle driver to sufficiently reduce the speed of the motor vehicle in a safe manner.

The laser transponder 28 also includes an optional motion detector 42 that senses whether the motor vehicle is in motion. Such a motion detector 42 can be implemented using many common automotive electronic devices, such as the speedometer present in all motor vehicles. Alternatively, engine RPM monitors and battery voltage monitors can be used as discussed above. When a motor vehicle is in motion, the motion detector 42 closes the motion detector gate 40 in order to enable the timing pulse to pass to a pulse generator 44.

In response to the timing pulse received from the timer 36 via the motion detector gate 40, the pulse generator 44 generates a pulse train having a constant pulse repetition frequency that is sufficiently high to disable the lidar speed monitor as discussed above. The pulse generator 44 transmits the pulse train to a laser 46 after activation by the timing pulse from the timer 36 via the motion detector gate 40. The pulse train transmitted by the pulse generator 44 causes the laser 46 to transmit the jamming laser beam to the lidar speed monitor as discussed above. It will be appreciated that the laser 46 is used rather than a light emitting diode (LED) because current LEDs do not generate light beams of sufficient power or spectral purity to disable the lidar speed monitor. A lens 47 may be positioned in front of the laser 46 and in the path of the jamming laser beam. The lens 47 is structured to cause the jamming laser beam to diverge a predetermined amount sufficient to direct the jamming laser beam at the speed monitor.

The laser transponder 28 includes a fault detector 48 coupled to the laser 46. The fault detector 48 checks for an overcurrent condition that could result from a fault in the laser transponder circuitry allowing the laser 42 to transmit the jamming laser beam longer than desired. When such an overcurrent condition occurs, the fault detector 48 causes a fault alert device 50 to alert the motor vehicle driver with a visual and/or audible warning. In addition, the fault detector 48 closes a power gate 52 which disconnects a power supply 54 from the laser 46 and thereby turns off the laser 46. The speed warning device 38 and the fault alert device 50 are at least in part mounted within the motor vehicle on a display panel 53.

Figure 5A:
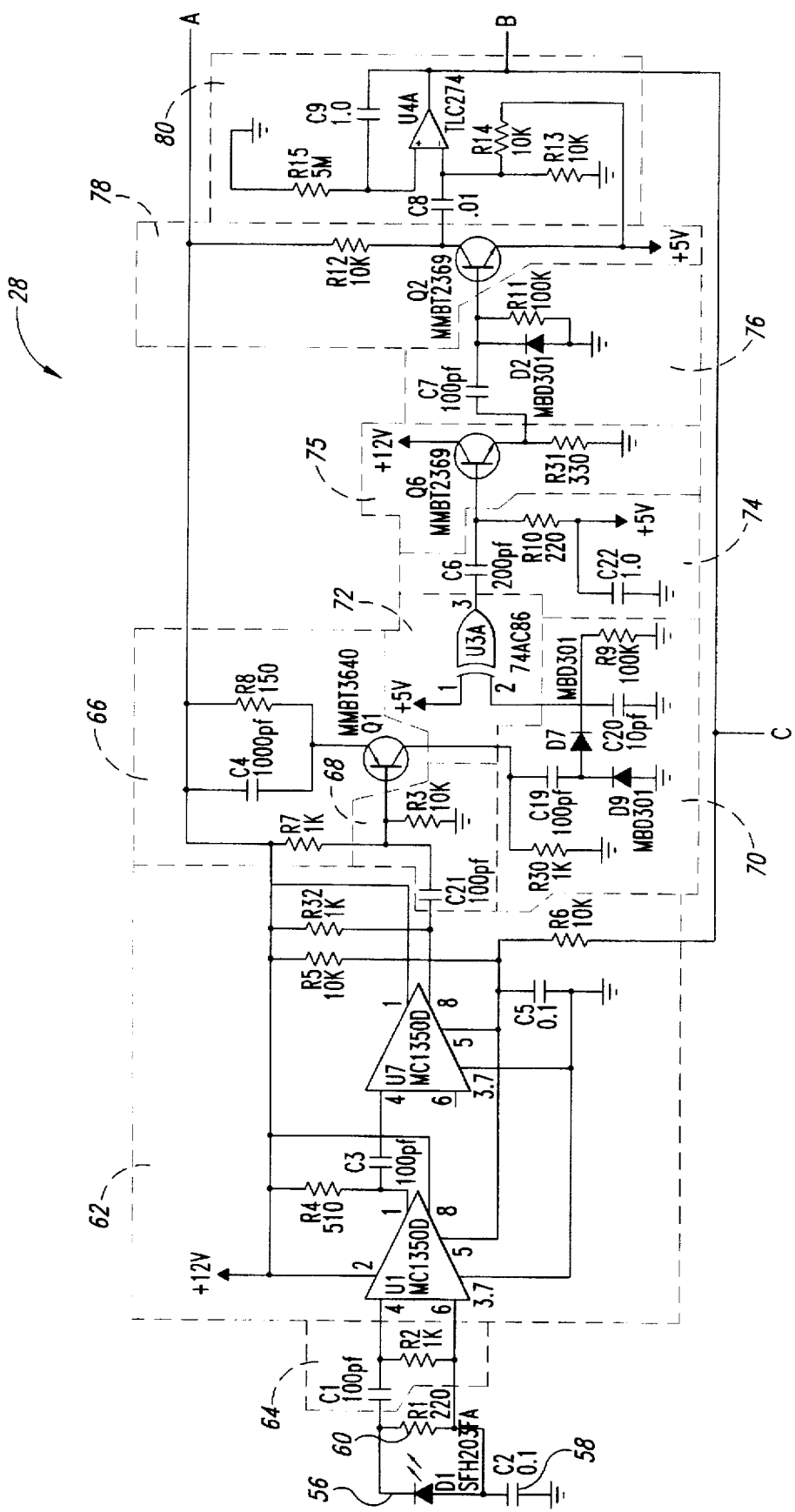
FIGS. 5A–5D together are a circuit diagram depicting a preferred embodiment of the laser transponder shown in FIG. 4.

A preferred embodiment of the laser transponder 28 is shown in FIGS. 5A–5D. The laser transponder 28 includes a photodiode 56 that receives an incoming laser beam (FIG. 5A). In a preferred embodiment, the photodiode 56 is a silicon photodiode, such as the SFH 203 FA by Siemens. The Siemens photodiode includes a 200 nM-wide spectral filter centered on a wavelength of 900 nM, which is close to the 905 nM wavelength typical of the monitor laser beams transmitted by current lidar speed monitors. Such a spectral filter is used to prevent background daylight from triggering the laser detector 30. The Siemens photodiode also features a built-in lens 31 (FIG. 4) with a relatively narrow (20°) optical acceptance angle in order to maximize the monitor laser beam signal received by the laser detector 30.

The photodiode 56 is connected to ground via a capacitor 58 and is also connected in parallel with a load resistor 60. The incoming laser beam causes the photodiode to develop a laser detection signal across the load resistor 60. The laser detector signal on the load resistor 60 is provided to a high frequency Motorola MC1350 amplifier circuit 62 via a high pass filter 64. The high frequency amplifier circuit 62 has a 30–50 MHz bandwidth which, in combination with the high pass filter 64, optimizes the signal-to-noise ratio of the laser detection signal for a signal that arises from a 15 nanosecond pulse in the incoming laser beam. Thus, the amplifier circuit 62 and the high pass filter 64 together comprise a matched filter. In addition, the amplifier circuit 62 includes AGC inputs that turn off the amplifier circuit 62, and thus, implement the gate 32 shown in FIG. 4.

The amplified laser detection signal output by the high frequency amplifier circuit 62 is transmitted to a PNP transistor circuit 66 via an RC network 68. The PNP transistor circuit 66 is coupled to a diode rectifier circuit 70. The PNP transistor circuit 66, RC circuit 68 and diode rectifier 70 stretch the narrow, 15 nanosecond pulse of the amplified laser detection signal output by the amplifier circuit 62 to a signal pulse over 500 microseconds in width. A CMOS inverter 72 connected to the diode rectifier circuit 70 is triggered by the 500 microsecond signal pulse. The CMOS inverter 72 inverts the 500 microsecond signal pulse and outputs the inverted 500 microsecond signal pulse to an RC circuit 74. The RC circuit 74 differentiates the pulse to produce negative and positive signal pulses. The negative and positive signal pulses are passed to an emitter follower circuit 75 which amplifies the current of the signal pulses. A diode rectifier 76 adds both negative and positive signal pulses together to generate a signal pulse having a pulse height in excess of 5 volts if the negative and positive signal pulses are closely spaced. The 5 volt signal pulse triggers an NPN transistor circuit 78 biased with 5 volts on the emitter terminal of the NPN transistor used in the circuit.

Together the PNP transistor circuit 66, RC circuit 68, diode rectifier circuit 70, CMOS inverter 72, RC circuit 74, diode rectifier 76 and NPN transistor circuit 78 constitute a preferred embodiment of the pulse discriminator 34 shown in FIG. 4. The diode rectifier 76 discharges relatively slowly such that a long pulse does not trigger the NPN transistor circuit 78. Such a long pulse would be generated if the incoming laser beam included a pulse train with a high pulse repetition frequency, such as the 2 MHz pulse train transmitted by the laser 42 of another laser transponder of the preferred embodiment shown in FIG. 4. As a result, the pulse discriminator 34 implemented by the circuit elements 66–78 outputs a signal only if the incoming laser beam detected by the diode laser 56 has a pulse repetition frequency similar to the pulse repetition frequency of a typical lidar speed monitor.

Coupled to the NPN transistor circuit 78 is a one shot timer 80 that transmits a 5 second timing pulse when activated by the signal output by the NPN transistor circuit 78 (FIG. 5A). The timing pulse transmitted by the one shot timer 80 is transmitted to the AGC inputs of the high frequency amplifier circuit 62 which disconnects the photodiode 56 from the pulse discriminator 34 implemented by circuit elements 66–78. In addition, the timing pulse from the one shot timer 80 is transmitted to a piezo alarm 82 (FIG. 5C) which outputs an audible alarm to the user. The audible alarm output by the piezo alarm 82 indicates to the motor vehicle driver that a monitor laser beam transmitted by the lidar speed monitor has been detected.

Figure 5B:
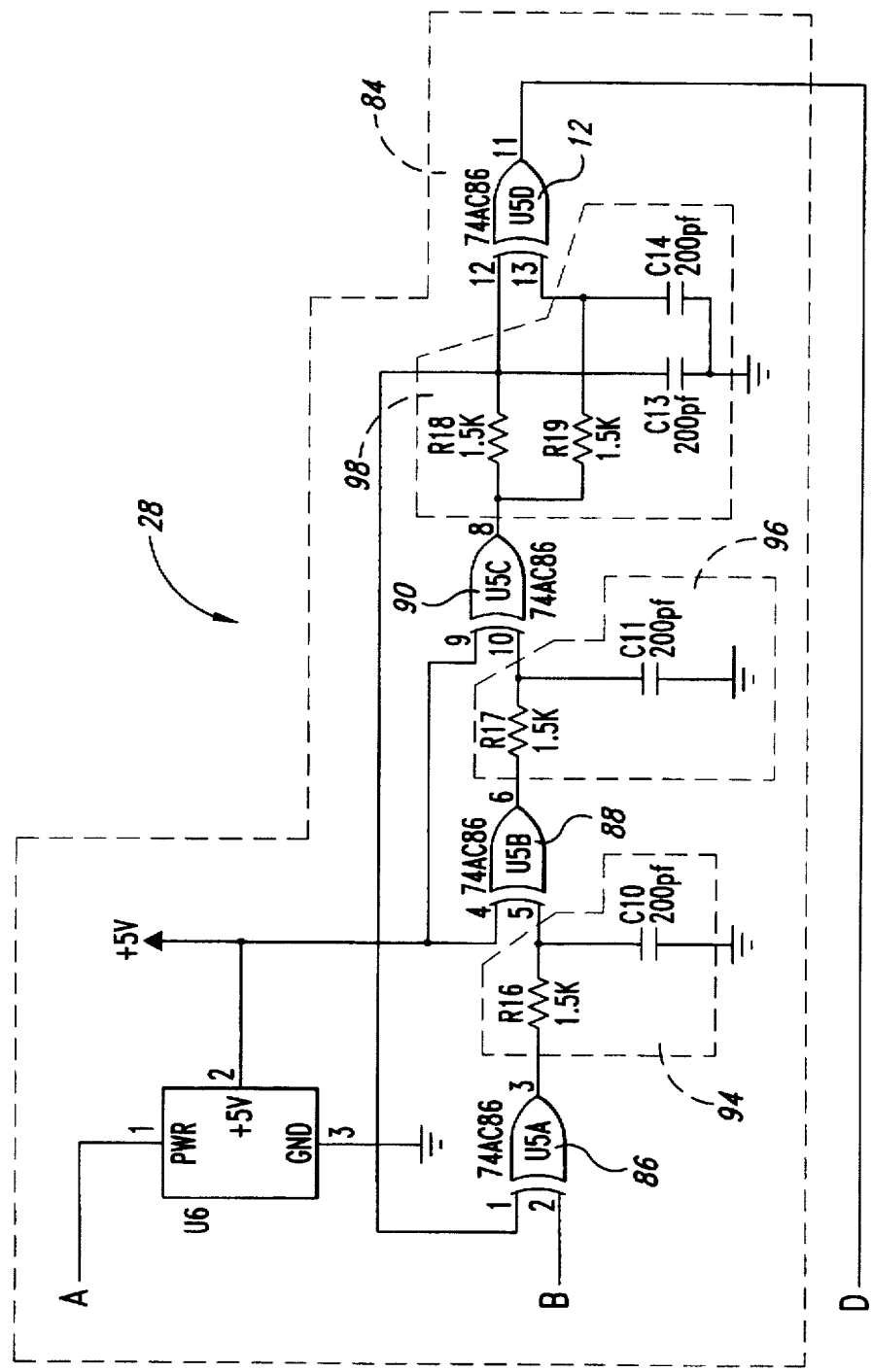

The timing pulse transmitted by the one shot timer 80 also is received by a pulse generator 84 shown in FIG. 5B. The pulse generator outputs 15 nanosecond pulses that are spaced 500 nanoseconds apart which results in a pulse train having a pulse repetition frequency of 2 MHz. The pulse generator 84 includes first, second, third, and fourth CMOS inverters 86, 88, 90, 92, respectively. First, second and third RC circuits 94, 96, 98, respectively, are positioned between the CMOS inverters 86, 88, 90, 92. Together the CMOS inverters 89–92 and RC circuits 94–98 of the pulse generator 84 form a 2 MHz oscillator. The third RC circuit 98 provides a differential delay in the input of the fourth CMOS inverter 92 which creates a single positive output pulse whose width is established by the mismatch between the third RC circuit 98 and the first and second RC circuits 94, 96.

Figure 5C:
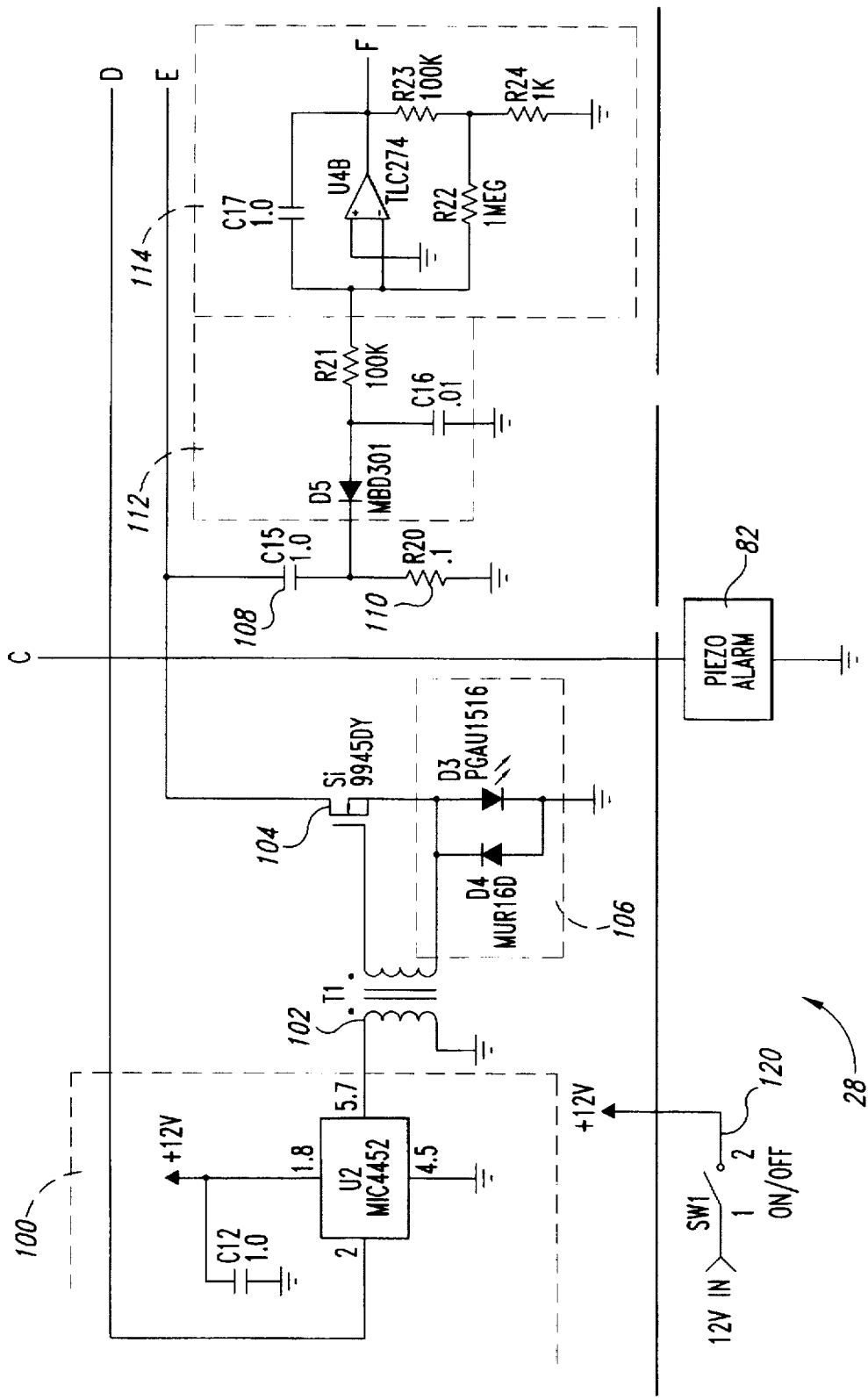

The pulse train produced by the pulse generator 84 is transmitted to a power MOSFET driver circuit 100 shown in FIG. 5C. The power MOSFET driver circuit 100 amplifies the pulse train received from the pulse generator 84. The power MOSFET driver circuit 100 drives a pulse transformer 102 and a high current, N-channel MOSFET switch 104. The pulse transformer 102 outputs a transformed pulse train to the MOSFET switch 104. The MOSFET switch 104 transmits 15 amp current pulses to a diode laser 106 when the transformed pulse train closes the MOSFET switch 104. The diode laser 106 is implemented in the preferred embodiment by a gallium arsenide laser sold by EG&G Optoelectronics under the name PGAUISI6. In response to the pulses from the MOSFET switch 104, the diode laser transmits the jamming laser beam with the desired 2 MHz pulse train. The pulse transformer 102 is used instead of a direct drive in order to keep the cathode (case) of the diode laser 106 at ground potential.

It should be noted that diode lasers, such as the diode laser 106, are not characterized by the manufacturer to operate at the 1–2 MHz pulse frequency of the jamming laser beam. We have found experimentally that for the short operating time used to transmit the jamming laser beam (5–10 seconds), adequate diode laser life can be obtained. The short operating time also eliminates elaborate heat sinking of the power devices of the laser transponder 28. As a result, it is possible to construct an inexpensive laser transponder 28 having a cost of not more than a few hundred dollars.

As discussed above with respect to FIG. 4, the laser transducer 28 includes the fault detector 48 that detects when an overcurrent condition occurs and disconnects the laser 42 from the power supply 50. In the preferred embodiment shown in FIGS. 5C and 5D, the fault detector 48 includes a capacitor 108 that provides energy for the pulse train transmitted to the diode laser 106 by the MOSFET switch 104 (see FIG. 5C). The capacitor 108 should have a low inductance and high current handling capabilities. The capacitor 108 can be constructed by paralleling many smaller capacitors in order to share current and thereby increase the current handling capabilities of the capacitor 108. A resistor 110 coupled to the capacitor 108 receives pulse current from the capacitor 108 and negative pulses are generated. A diode rectifier circuit 112 connected to the resistor 110 rectifies the negative pulses from the resistor 110. The diode rectifier circuit 112 is connected to an integrator circuit 114 which receives the rectified pulses from the diode rectifier circuit. Coupled to the integrator circuit 114 is a threshold/latch circuit 116 (see FIG. 5D) that is triggered by the output from the integrator circuit 114 if that output is greater than 5 volts. The output from the integrator circuit 114 will be sufficient to trigger the threshold/latch circuit 116 if the pulse train that triggers the diode laser 106 exceeds a predetermined time, such as 10 seconds. In addition, the integrator circuit 114 will also trigger the threshold/latch circuit 116 if the diode laser 106 is frequently retriggered by successive pulse trains. The threshold/latch circuit 116 is coupled to a P-channel MOSFET switch circuit 118 of FIG. 5D that shuts off when the threshold/latch circuit 116 is triggered into producing a high output signal. When the P-channel MOSFET switch circuit 118 shuts off, then the power to the N-channel MOSFET switch circuit 104 is disconnected, which turns off the diode laser 106. As a result, circuit elements 108–118 together implement a preferred embodiment of the fault detector 48 shown in FIG. 4.

Figure 5D:
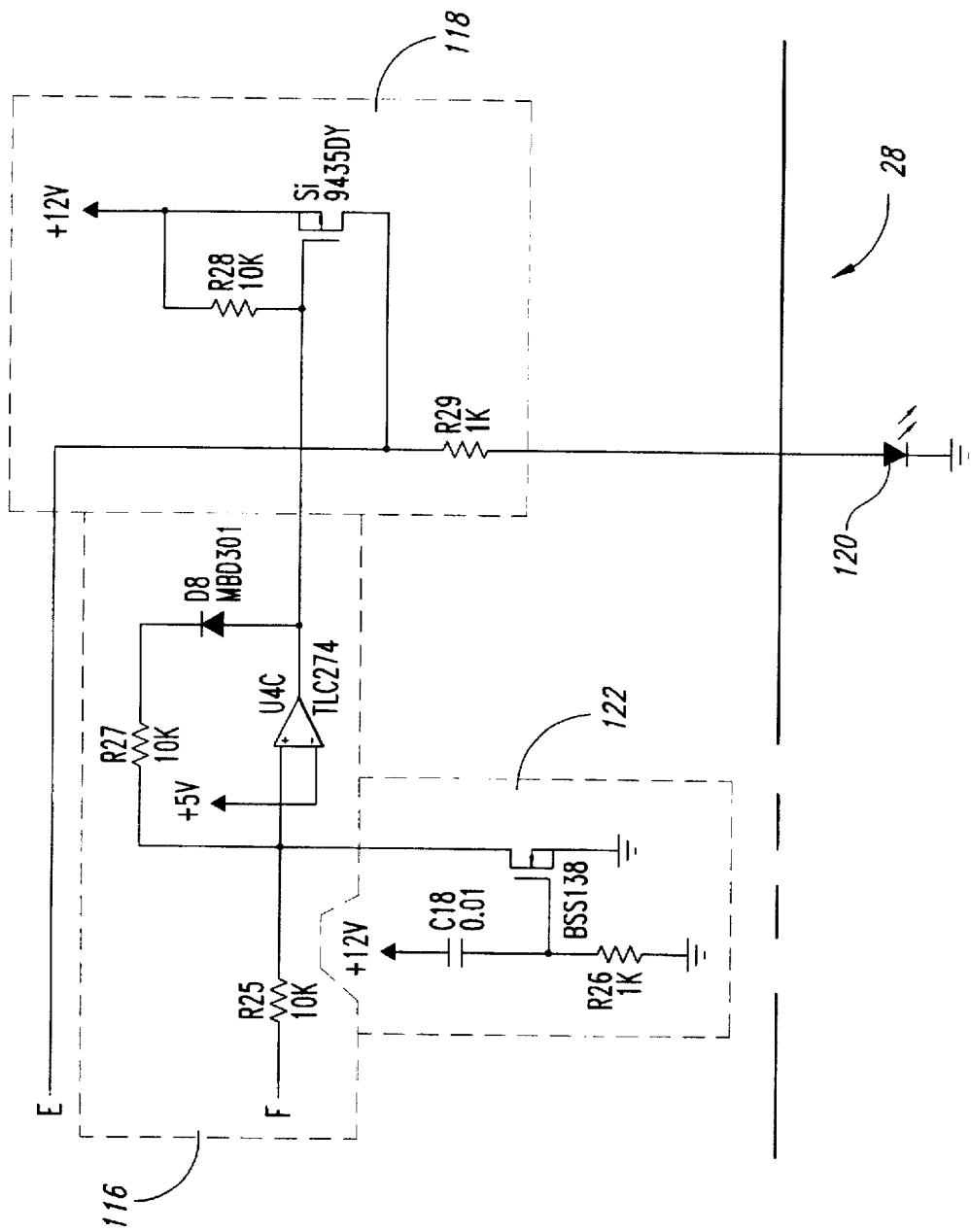

The P-channel MOSFET switch circuit 118 is coupled to an LED warning light 120. Under normal operating conditions, the P-channel MOSFET switch circuit 118 provides power to the LED warning light 120, which lights up to indicate that the laser transducer 28 is operating normally. When an overcurrent condition occurs, the shut off of the P-channel MOSFET switch circuit 118 removes power from the LED warning light 120, thereby indicating to the driver that an over current condition has occurred and the diode laser 106 has been turned off. As a result, the shut off of the P-channel MOSFET switch circuit 118 will prevent thermal damage to the semiconductor devices of the laser transducer 28 which are not rated for continuous duty in the embodiment shown in FIGS. 5A–5D. In addition, the shut off of the P-channel MOSFET switch circuit 118 will also prevent inadvertent eye exposure in the event of the over current condition. To reset the laser transducer 28, the motor vehicle driver can activate a power switch 122 (FIG. 5C) which triggers a pull down n-channel FET transistor circuit 124 (FIG. 5D). The pull down transistor circuit 122 returns the output of the integrator 116 to a low level which opens the P-channel MOSFET switch circuit 118 and returns the laser transducer 28 to normal operation.

The simplicity of the laser transducer 28 enables the laser transducer to be implemented in a housing (not shown) that can mount on a typical license frame of a motor vehicle. A housing dimension of 6 inch by 1 inch by ½ inch or less is feasible. The housing preferably is made from metal so that the housing can act as a heat sink for the diode laser 106.

It will be appreciated that the laser transducer 28 shown in FIGS. 4 and 5A–5D and the method shown in FIG. 3 enable a lidar speed monitor to be disabled for a sufficient period of time that enables a motor vehicle driver to reduce the speed of the motor vehicle in a safe manner. The laser transducer and method include numerous safety features that prevent inadvertent exposure to the jamming laser beam transmitted by the laser transducer. In addition, the laser transducer and method can be implemented in a relatively simple circuit that does not require the pulse repetition frequency of the lidar speed monitor to be analyzed and matched. In addition, the laser transducer and method disable the lidar speed monitor regardless of whether the pulse repetition rate of the monitor laser beam transmitted by the lidar speed monitor is constant, unstable, random, or programmed.

Figure 6:
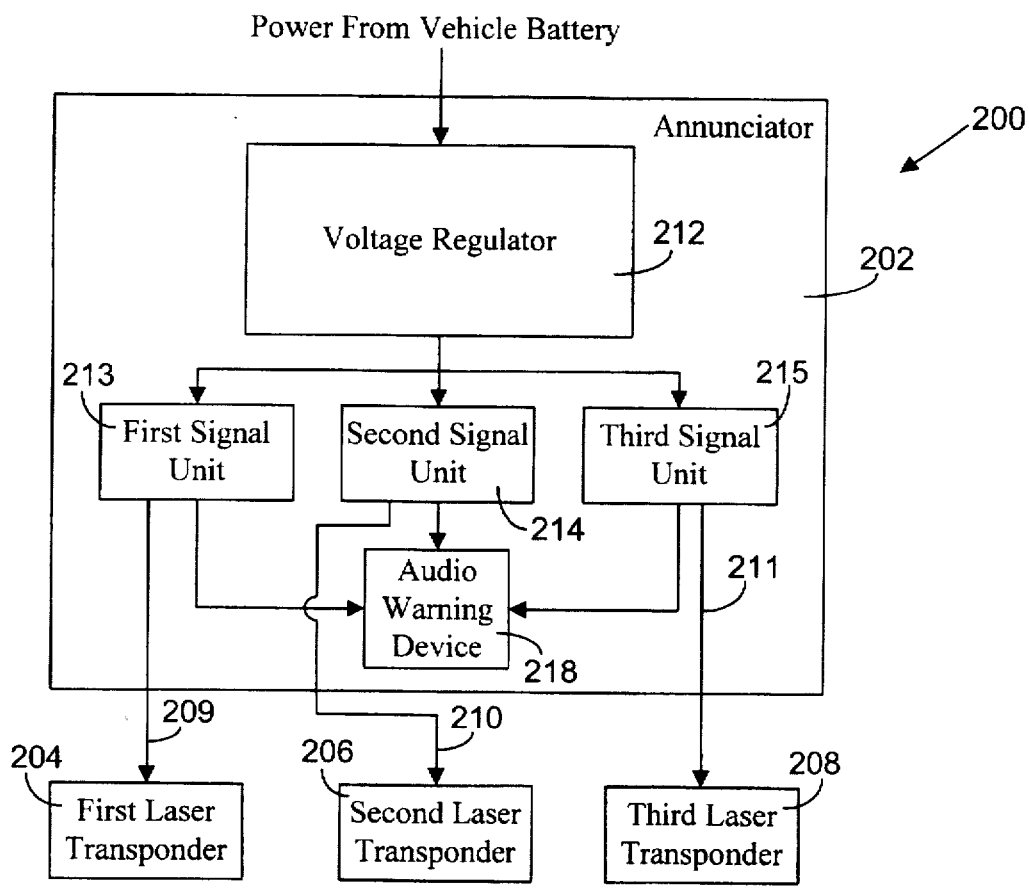
FIG. 6 is a block diagram of a laser speed monitor disabling system according to the present invention.

A preferred embodiment of a lidar speed monitor disabling system 200 incorporating the present invention for temporarily disabling a lidar speed monitor is shown in FIG. 6. The disabling system 200 includes an annunciator 202 positioned within the vehicle at a location within view and/or hearing of the vehicle driver. The disabling system 200 also includes first, second, and third laser transponders 204, 206, 208 that are coupled to the annunciator 202 by first, second, and third connection lines 209, 210, 211, respectively. Each of the laser transponders 204–208 includes a laser detector and a laser that enable the disabling system 200 to detect and disable the lidar speed monitor similar to the manner discussed above with respect to FIGS. 2–5D. Each of the laser transponders 204–208 is positioned at a different location on the exterior of the vehicle so that the monitor laser beam from the lidar speed monitor can be detected at any of the different locations on the vehicle. Use of a plurality of laser transponders is particularly beneficial when the vehicle is relatively large. It will be appreciated that the disabling system 200 can include as many laser transponders as are needed to detect a monitor laser beam directed at any point on the vehicle.

The annunciator 202 supplies power from the vehicle battery to each of the laser transponders 204–208 via the connection lines 209–211. Although a typical vehicle battery has a nominal voltage of 12 volts, the actual voltage output by the vehicle battery can range from about 12 to 18 volts. As the power of a diode laser increases rapidly with its supply voltage, it is not desirable to use the unregulated voltage from the vehicle battery to supply the diode laser. The annunciator includes a voltage regulator 212 that receives the variable voltage from the vehicle battery and produces a stable operating voltage without suffering from a high voltage drop. The regulated voltage produced by the voltage regulator 212 is transmitted to first, second, and third signal units 213, 214, 215 which supply the regulated voltage (with or without a small voltage drop) to the first, second, and third laser transponders 204, 206, 208, respectively via the first, second, and third connection lines 209, 210, 211, respectively. Preferably, each of the signal units 213–215 includes a current sensor (FIG. 10) that senses the current being drawn by the respective laser transponder to which the signal unit is coupled. If any of the signal units 213–215 senses that the current being drawn by one of the laser transponders 204–208 through its respective connection line 209–211 has greatly increased, then the signal unit triggers an audio warning device 218 into providing a speed monitor warning to the vehicle driver. In addition, each of the signal units 213–215 preferably includes an indicator light that provides a visual warning to the driver when the current drawn by the corresponding laser transponder has greatly increased. Such an increase in current indicates either that the laser transponder was turned on very recently or that the laser transponder is transmitting the jamming laser beam. Using the current in the power line to test the annunciator and to determine if the jamming laser beam is being transmitted allows each of the connection lines 209–211 to be a simple two-wire connector rather than a multiple wire connector.

Figure 7:
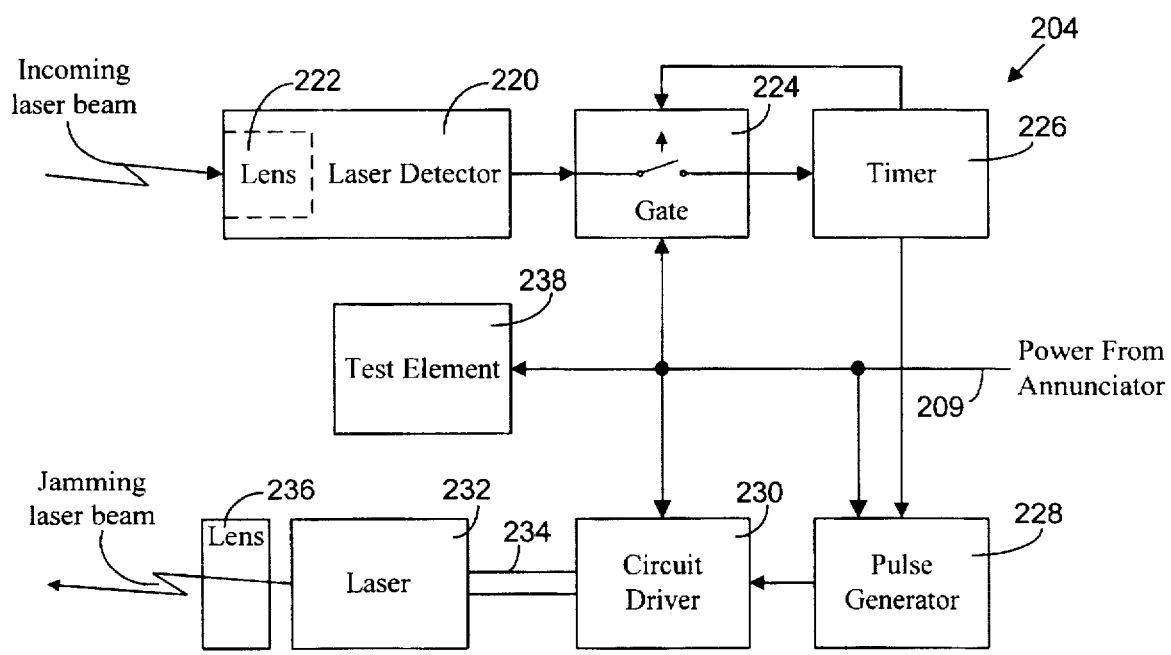
FIG. 7 is a block diagram of a laser transponder employed in the disabling system shown in FIG. 6.

A preferred embodiment of the first laser transponder 204 is shown in FIG. 7. It will be appreciated that the second and third laser transponders 206 and 208 preferably are structured similarly. The laser transponder 204 shown in FIG. 7 is similar to the laser transponder 28 shown in FIG. 4 except that the laser transponder 204 has been designed specifically to limit inductive voltage losses sufficiently to enable the laser transponder 204 to be powered using only a conventional vehicle battery.

Like the laser transponder 28 shown in FIG. 4, the laser transponder 204 shown in FIG. 7 includes a laser detector 220 with a lens 222 that receives the incoming monitor laser beam from the lidar speed monitor. In addition, the laser transponder 204 includes a gate 224 and a timer 226 that operate as discussed above with respect to the gate 32 and timer 36 shown in FIG. 4. That is, in response to a detection signal received from the laser detector 220 via the gate 224, the timer 226 opens the gate 224 to prevent the laser detector 220 from retriggering the transmission of a jamming laser beam. In addition, the timer 226 transmits a timing pulse to a pulse generator 228.

In response to the timing pulse received from the timer 226, the pulse generator 228 generates a pulse stream having a constant pulse repetition frequency that is sufficiently high to disable the lidar speed monitor as discussed above. The pulse generator 228 transmits the pulse stream to a driver circuit 230 which amplifies the pulse stream and transmits the amplified pulse stream to a diode laser 232 via a microstrip transmission line 234. The amplified pulse stream causes the laser 232 to transmit a jamming laser beam through a lens 236 to the lidar speed monitor as discussed above.

The laser transponder 204 also includes a test element 238 that is employed to test the integrity of the connection line 209 connecting the laser transponder 204 with the annunciator 202. The connection line 209 is connected to the gate 224 pulse generator 228, driver circuit 230, and test element 238 in order to receive power from the vehicle battery via the annunciator 202. The test element 238 preferably has a relatively low initial impedance when the disabling system 200 is initially turned on, that enables the current in the connection line 209 to be of an amount that simulates the current that exists when the laser 232 is transmitting the jamming laser beam. After an initial testing period elapses, the impedance of the test element 238 has changed sufficiently to change the current in the connection line 209 to an amount that clears the annunciator 202 and, thereby, prepares the annunciator to be retriggered when the monitor laser beam from the lidar speed monitor is actually detected. By enabling the annunciator 202 to be triggered and then cleared after an initial test period elapses, the test element 238 allows the integrity of the connection line 209 to be tested every time the disabling system 200 is turned on. As discussed below with respect to FIG. 5B, the test element 238 preferably is implemented using a PTC thermistor 272.

As discussed above, the jamming laser beam transmitted by the laser 232 includes a train of pulses with a frequency high enough (e.g., 2 MHz) to jam the lidar speed monitor. Each pulse of the jamming laser beam should have a pulse width of approximately 15 nanoseconds at 50% of the maximum value of the pulse in order to mirror the pulses received in the monitor laser beam from the lidar speed monitor. Such a pulse width corresponds to rise and fall times of about 10 nanoseconds for each pulse. The total available supply voltage from a conventional vehicle battery typically is between 12 and 14 volts depending on the voltage regulator 212 and the electrical features of each of the laser transponders 204–208. In order to deliver about 7 watts of peak laser power, the current supplied to the diode laser 232 needs to be approximately 15 amps of peak current. Given that the total inductive voltage drop of each of the laser transponders 204–208 is V=L (di/dt), the maximum circuit inductance (L) at 13 volts, therefore, is:

$$13 \text{ volts} = L(15 \text{ amps}/10 \times 10^{-9} \text{ seconds})$$

$$L = 8.67 \text{ nanohenries (nH)}.$$

Given the limited maximum inductance available for each of the laser transponders 204–208, the prior art drive circuits typically employed to drive high-powered diode lasers cannot be employed without supplementing the limited voltage available from the conventional vehicle battery. The preferred embodiment of the present invention limits the inductance of each of the laser transponders 204–208 in several ways. First, the microstrip transmission line 234 is designed to act as both a printed circuit board for mounting of the driver circuit 230 as well as a low impedance transmission line to interconnect the driver circuit 230 and the laser 232. If a high impedance transmission line were used, the interconnecting traces between the elements of the laser transponder 204 would contribute inductance and a narrow, high current, pulse could not be generated using only a 13 volt power supply.

Figure 8:
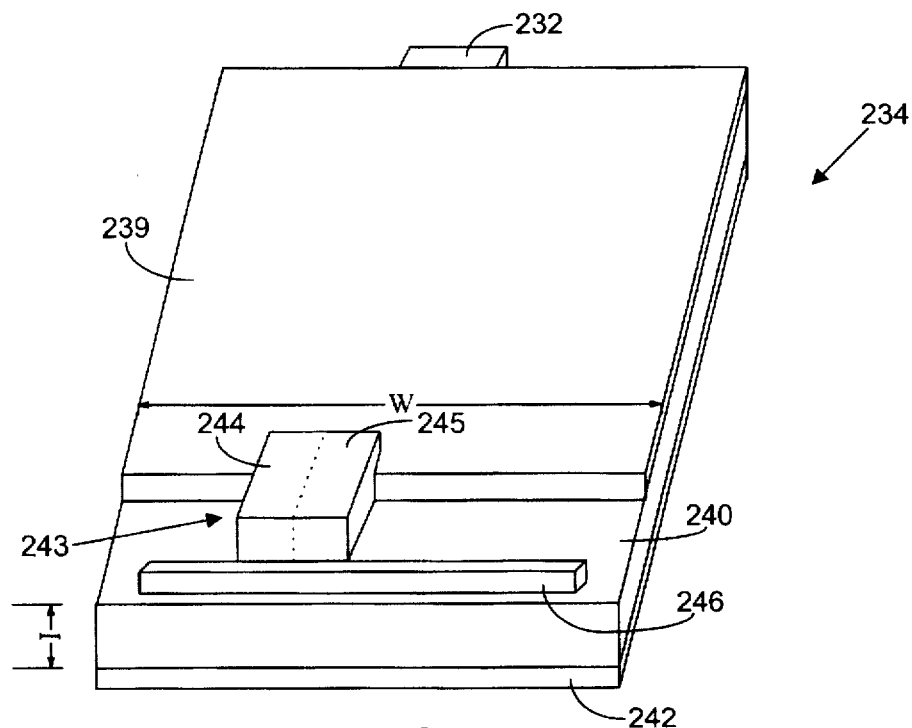
FIG. 8 is a schematic isometric view of a microstrip transmission line used in the laser transponder shown in FIG. 7.

A schematic isometric view of the preferred embodiment of the microstrip transmission line 234 is shown in FIG. 8. The microstrip transmission line 234 includes a strip conductor 239 bonded to a dielectric substrate 240 mounted on an electrically conductive ground plane 242. In order to limit the impedance of the microstrip transmission line 234, the dielectric substrate 240 should be made of a material with a relatively high dielectric constant, such as Kapton having a dielectric constant of 3.5. The characteristic impedance of a microstrip transmission line is $Z=(377/\epsilon)(T/W)$ where $\epsilon$ is the dielectric constant of the dielectric substrate, T is the thickness of the dielectric substrate, and W is the width of the strip conductor. In the preferred embodiment, the dielectric substrate 240 is a 0.005 inch thick board of Kapton and the width of the strip conductor 239 is 0.8 inches for a characteristic impedance Z of approximately 1.2 ohms. This represents an effective match to the drive components since the effective impedance of the drive components equals V/I (13/10), which equals 1.3 ohms including the diode impedance of approximately 0.2 ohms. As can be seen in FIG. 8, the strip conductor 239 extends substantially entirely across the dielectric substrate 240 in order to limit the impedance of the microstrip transmission line 234 without requiring an overly large dielectric substrate.

Surface mounted directly on the microstrip transmission line 234 is a field effect transistor (FET) switch 243 that drives the diode laser 232. The driver FET 243 is mounted directly on the strip conductor 239 which is directly connected to the diode laser 232. Preferably, the driver FET switch 243 includes at least two driver FETs 244, 245 employed in a dual channel setup in order to minimize the total inductance of the driver FET switch 243. In addition, an energy storage capacitor array 246 is surface-mounted directly on the dielectric substrate 240 of the microstrip transmission line 234. The energy storage capacitor array 246 is connected to the driver FET 243 and comprises a plurality of surface-mounted ceramic capacitors in order to produce low inductance at a low cost.

Figure 9A:
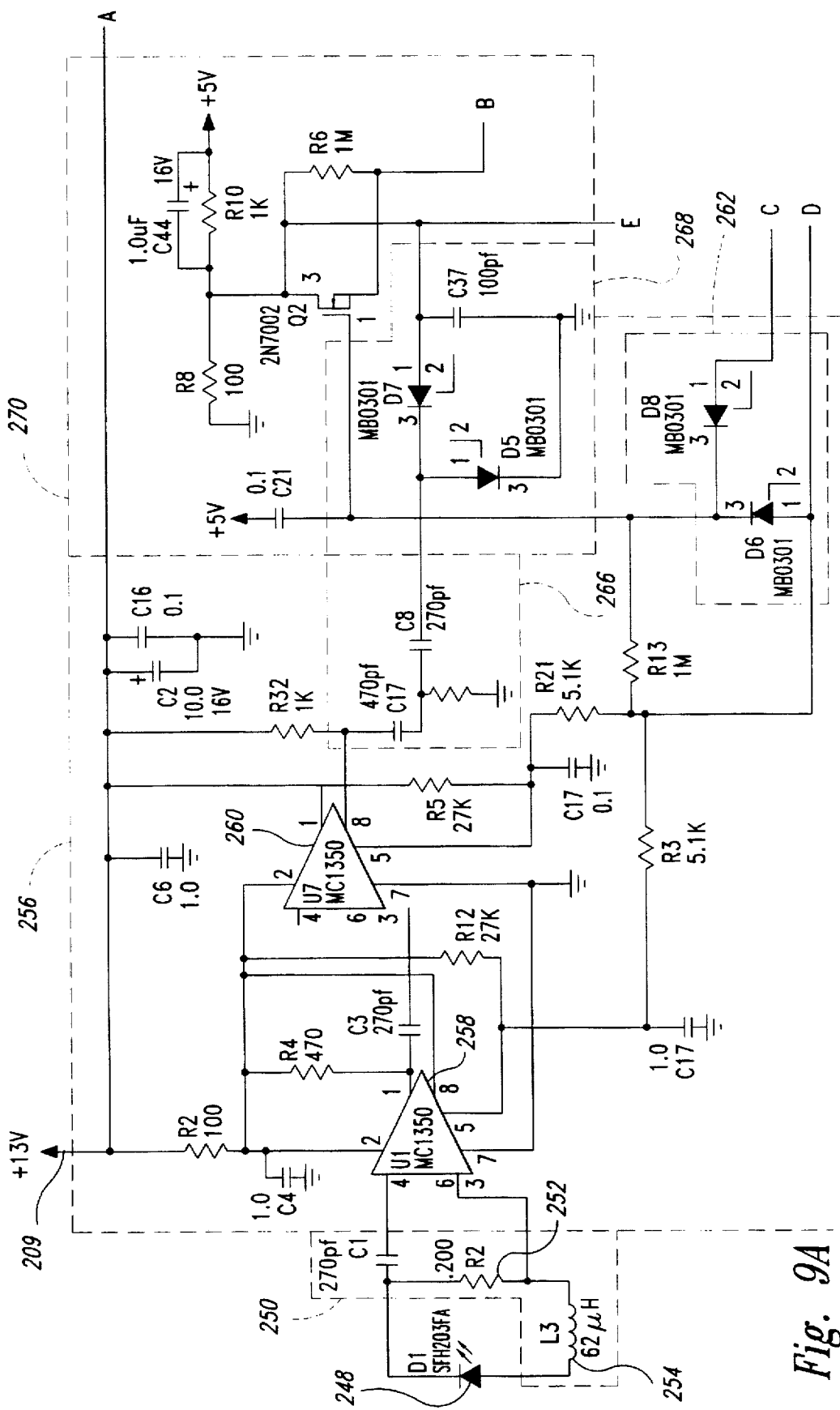
Figure 9B:
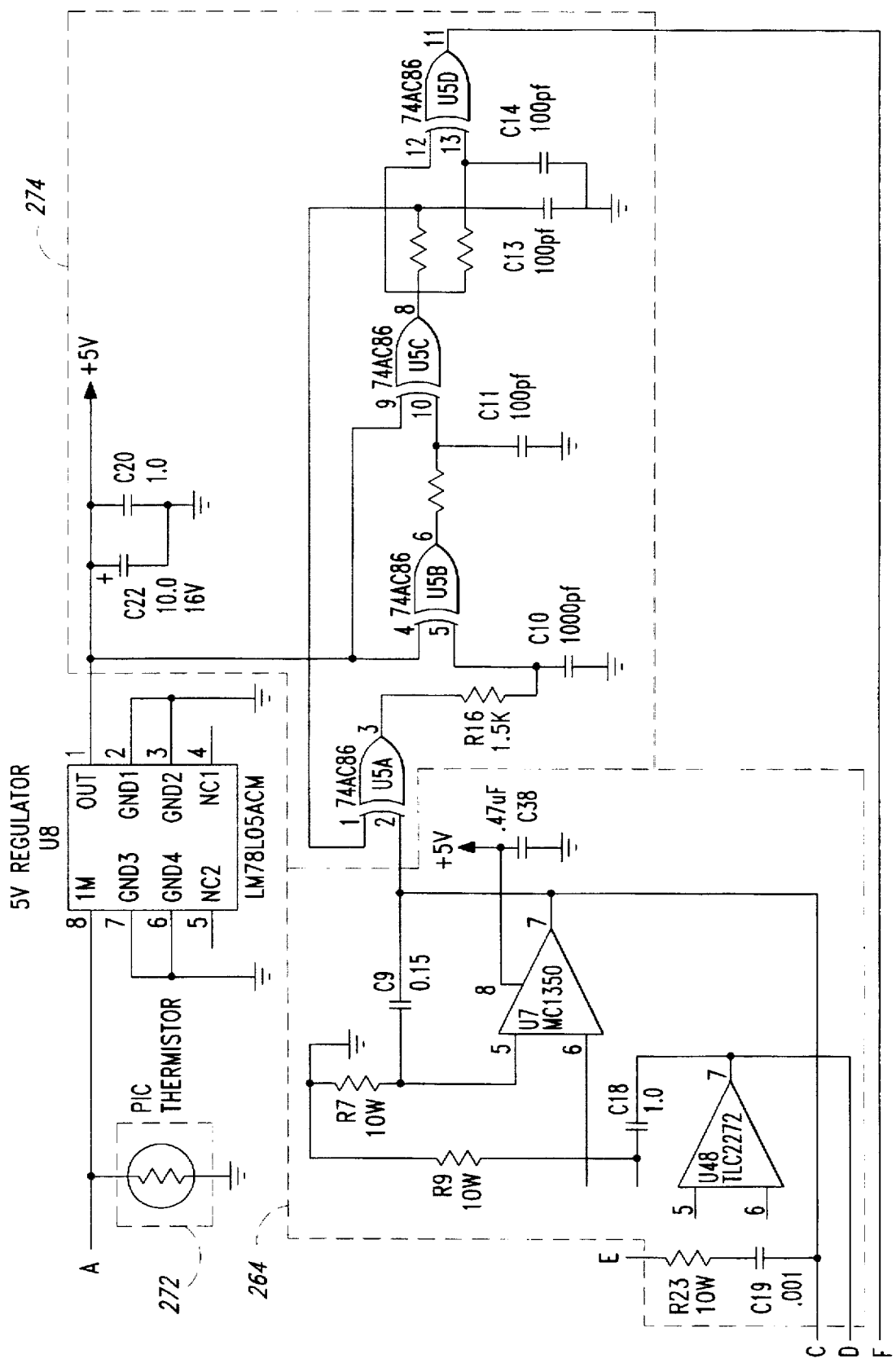

A circuit diagram of the first laser transponder 204 is shown in FIGS. 9A–9C. Many of the elements of the laser transponder 204 shown in FIGS. 9A–9C correspond to similar elements of the laser transponder 28 shown in FIGS. 5A–5D. Accordingly, only the detail elements of FIGS. 9A–9C that differ from corresponding elements of FIGS. 5A–5D will be discussed. Those skilled in the art will recognize that much of the discussion above with respect to the circuitry of FIGS. 5A–5D is also applicable to the laser transponder 204 of FIGS. 9A–9C.

As shown in FIG. 9A, the laser transponder 204 includes a photodiode 248 that receives the incoming monitor laser beam. Preferably, the photodiode 248 preferably is substantially identical to the photodiode 56 shown in FIG. 5A. The photodiode 248 preferably is connected to a pi network 250 that includes a load resister 252 across which a laser detection signal is formed when the photodiode detects the incoming monitor laser beam. The pi network 250 preferably also includes an inductor 254 that enables the load resister 252 to be of a higher value for additional sensitivity without giving up bandwidth.

The laser detection signal on the load resistor 252 is provided to a high-frequency Motorola MC1350 amplifier circuit 256. The high-frequency amplifier circuit 256 has a 30–50 MHz bandwidth that optimizes the signal-to-noise ratio of the laser detection signal for a signal that arises from the 15 nanosecond pulse in the incoming monitor laser beam. The amplifier circuit 256 includes first and second amplifiers 258 and 260 that together produce an amplified laser detection signal. The second amplifier 260 includes an AGC input coupled to a first diode rectifier circuit 262. In response to receiving signals from a timer circuit 264 (FIG. 9B), the first diode rectifier circuit 262 triggers the AGC input of the second amplifier 260 and thereby turns off the second amplifier 260 in order to prevent retriggering of the jamming laser beam by noise. Accordingly, the diode rectifier circuit 262 and the AGC input of the second amplifier 260 enable the amplifier circuit 256 to implement the gate 224 of FIG. 7.

The amplified laser detection signal output by the amplifier circuit 256 is transmitted via an RC network 266 to a second diode rectifier circuit 268 (FIG. 9A). The RC circuit 266 and the second diode rectifier circuit 268 stretch the narrow, 15 nanosecond pulse of the amplified laser detection signal output by the amplifier circuit 256 to a signal pulse over 500 microseconds in width. In addition, the second diode rectifier circuit 268 removes reverse pulses in the amplified laser detection signal.

The timer circuit 264 is coupled to the second diode rectifier circuit 268 and transmits a 5 second timing pulse when activated by the signal output by the diode rectifier circuit 268 (FIGS. 9A and 9B). It will be appreciated that the timer circuit 264 easily could be designed to transmit a longer or shorter timing pulse depending on how long the lidar speed monitor is desired to be disabled. The timer circuit 264 is also coupled to a switch circuit 270 (FIG. 9A) that disables the timer circuit 264 when the laser transponder 204 is initially turned on in order to prevent accidental laser firing. The timer circuit 264 also transmits signals to the first diode rectifier circuit 262 via lines C and D in order to turn off the amplifier circuit 256 and thereby prevent retriggering of the jamming laser beam (FIGS. 9A and 9B).

Coupled to the connection line 209 from the annunciator 202 is a positive temperature coefficient (PTC) thermistor 272 (FIG. 9B). The PTC thermistor 272 implements the test element 238 (FIG. 7) to test the integrity of the connection line 209. The PTC thermistor 272 has an impedance of about 10 ohms when cold. When the laser transponder 204 is initially supplied with power via the connection line 209, the current on the connection line reaches approximately 1.3 amps. A current sensor (FIG. 10) in the annunciator 202 senses the 1.3 amp current in the connection line 209 and responds by causing the annunciator 202 to output an audible and/or visual warning to the vehicle driver. Such a warning indicates to the vehicle driver that the laser transponder 204 is properly connected to the annunciator 202 via the connection line 209 without operating the laser 232. Within a second, the resistance of the PTC thermistor 272 increases to approximately 260 ohms, which causes the current through the PTC thermistor to drop to approximately 50 milliamps (mA) and causes the current in the connection line 209 to drop to about 100 mA. The current sensor (e.g., diode 302 of FIG. 10) in the annunciator 202 senses the reduced current and, in response, resets the annunciator.

As discussed above, the timer circuit 264 produces a 5 second timing pulse in response to the photo diode 248 detecting the incoming monitor laser beam. The timing pulse is transmitted by the timer circuit 246 to a pulse generator 274 as shown in FIG. 9B. The pulse generator 274 is powered by a 5 volt voltage regulator 276 and generates a pulse train having a pulse repetition frequency of 2 MHz. The pulse generator 274 operates similar to the manner discussed above with respect to the pulse generator 84 shown in FIG. 5B.

The pulse train produced by the pulse generator 274 is transmitted through a power MOSFET driver 278 shown in FIG. 9C. The power MOSFET driver 278 amplifies the pulse train and provides the amplified pulse train to a ringing circuit 280. The ringing circuit 280 is a series-resonant circuit with a half-period set for approximately 15 nanoseconds in order to match the 15 nanosecond pulses expected by the lidar speed monitor. The use of the ringing circuit 280 enables the pulse generator 274 to employ high speed CMOS logic to generate pulses that have the required fast rise times but have greater than 15 nanosecond pulse width.

The pulse train from the ringing circuit 280 is transmitted to a pulse transformer 282 that outputs a transformed pulse train to a third diode rectifier circuit 284. The third diode rectifier circuit 284 damps out negative voltages so that substantially only a single positive pulse is transmitted. The rectified output of the third diode rectifier circuit 284 is transmitted to the dual FET switch 244 which is discussed above with respect to FIG. 8. The driver FET switch 243 transmits 7 to 15 amp current pulses to the diode laser 232 via the microstrip transmission line 234 which causes the diode laser 232 to transmit the jamming laser beam. The driver FET switch 243 is powered by the energy storage capacitor array 246 and the connection line 209 via an inductor 286. A small array 288 of series-connected sampling resisters are employed to measure pulse performance and allow testing. A diode laser protection circuit 290 is connected in parallel to the diode laser 232 to prevent reverse voltages from damaging the diode laser 232.

Figure 10:
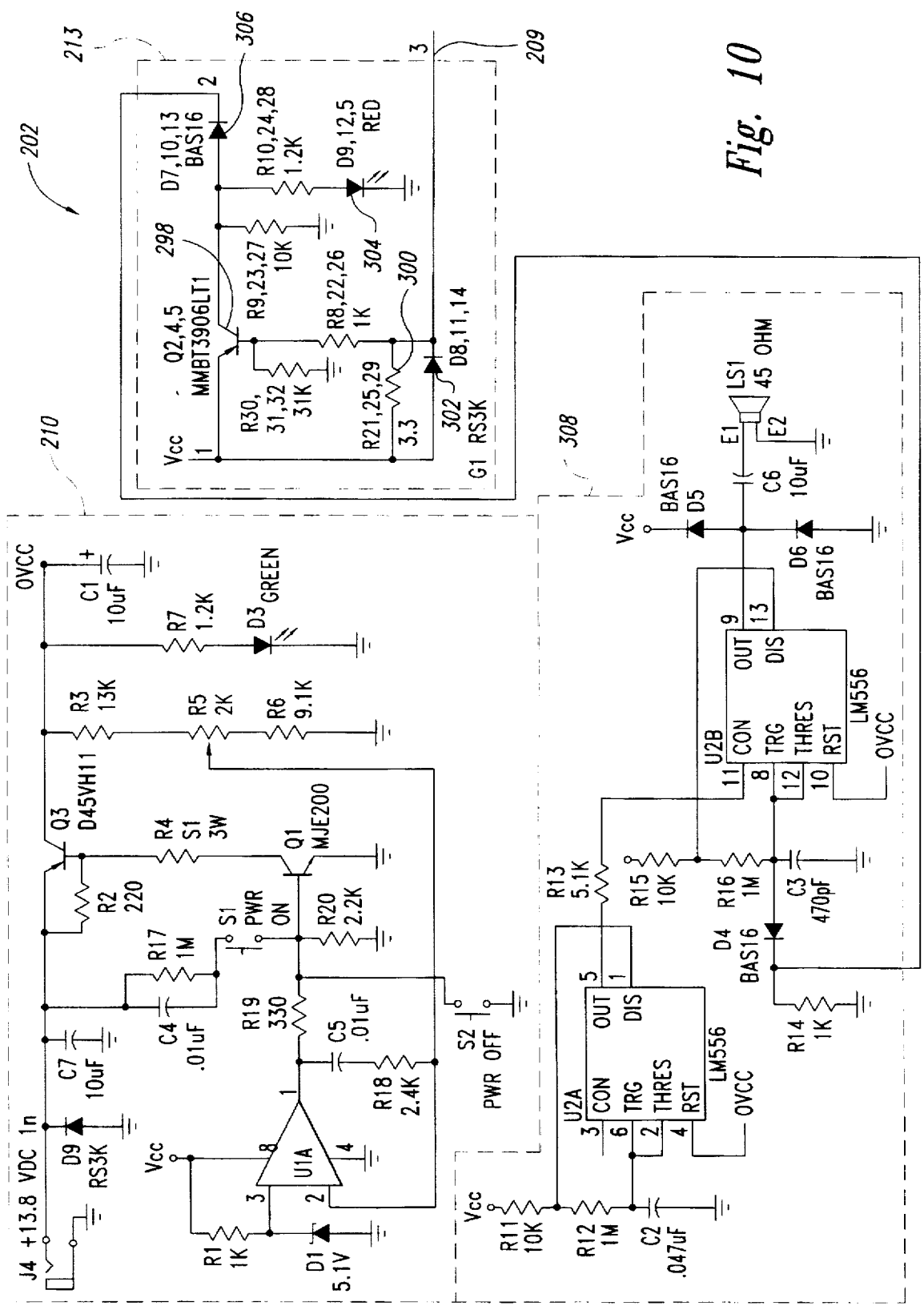
FIG. 10 is a circuit diagram depicting a preferred embodiment of an annunciator of the disabling system shown in FIG. 6.

The circuit diagram of a preferred embodiment of the annunciator 202 is shown in FIG. 10. The annunciator 202 includes the voltage regulator 212 to convert the variable voltage from the vehicle battery to a stable voltage of approximately 13 to 13.3 volts. The voltage regulator 212 employs a PNP transistor 292 with its collector providing a VCC voltage output which is coupled to an error amplifier 294. The PNP transistor 292 can be the junction transistor shown in FIG. 10 or a P-channel FET can be employed. Such an arrangement enables the voltage regulator 212 to generate the regulated VCC voltage output of 13 to 13.3 volts with a voltage drop of less than 0.5 volts. Preferably, also coupled to the collector of the PNP transistor 292 is a light emitting diode 296 that indicates when the annunciator 202 has been turned on.

The VCC voltage output of the voltage regulator 212 is coupled to the first signal unit 213 as shown in FIG. 10. It will be appreciated that the second and third signal units 214 and 215 are substantially identical to the first signal unit 213 shown in FIG. 10. Thus, for simplicity, the circuit diagrams for the second and third signal units 214, 215 are not shown in FIG. 10.

The first signal unit 213 includes a PNP transistor 298 having a resistor 300 and a diode 302 connected across its base-emitter junction. When the first laser transponder 204 is in its standby mode, the current in the connection line 209 is approximately 100 mA which is insufficient to turn on the transistor 298. When the laser transponder is initially turned on or when the diode laser 232 is transmitting, the current in the connection line 209 increases to approximately 800 mA or greater. Such a relatively large current creates a 0.8 voltage drop across the resistor 300, diode 302, and the base-emitter junction of the transistor 298, which turns on the transistor 298. Turning on the transistor 298 causes current to be directed to a light emitting diode 304 which provides to the vehicle driver a visual warning that the diode laser 232 is transmitting the jamming laser beam. In addition, turning on the transistor 298 transmits current through a steering diode 306 to a common audible buzzer circuit 308 which provides an audible warning to the vehicle driver. As a result, the diode 302 acts as the current sensor to trigger the transistor 298 in response to increased current on the connection line 209. Even with the 0.8 voltage drop from the transistor 298, approximately 12.5 volts are available on the connection line 209 to operate the laser transponder 204.

It will be appreciated that the laser speed monitor disabling system described above, particularly with respect to FIGS. 6–10, provides an effective system for disabling a lidar speed monitor that is powered only by a standard, conventional vehicle battery. The invention enables the laser transponder to mimic the short, fast-rising pulses employed by lidar speed monitors without requiring expensive power sources. Such short, fast-rising pulses using only the power from the vehicle battery are made possible by strictly limiting the inductive voltage drops in the circuits driving the diode laser of the laser transponder. In addition, the invention enables plural laser transponders to be positioned at numerous locations on a vehicle in order to detect and jam lidar speed monitors that can direct monitor laser beams at various locations on the vehicle. Such a design is particularly advantageous when the vehicle being protected is a large vehicle. Moreover, the invention provides a dependable lidar disabling system by automatically self-testing the connection line between the laser transponder and the annunciator.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A speed monitor disabling system for disabling a laser-based speed monitor, the speed monitor being of a type that transmits a monitor laser beam at a moving vehicle, receives a reflected laser beam from the moving vehicle, and determines the speed of the moving vehicle based on the time elapsed between transmitting the monitor laser beam and receiving the reflected laser beam, the monitor laser beam including a monitor pulse having a pulse width, the moving vehicle including a vehicle battery having a voltage of approximately eighteen volts or less, the disabling system comprising:

a laser detector positioned on the moving vehicle to detect the monitor laser beam transmitted by the speed monitor and transmit a detection signal in response to detecting the monitor laser beam;

a laser transmitter configured to transmit to the speed monitor a jamming laser beam having a pulse width substantially matching the pulse width of the monitor laser beam, the laser transmitter having a characteristic inductance; and a drive circuit coupled to the vehicle battery, laser detector, and laser transmitter in a manner that supplies electrical power from the vehicle battery to the laser transmitter in response to receiving the detection signal from the laser detector, the drive circuit having a drive inductance that, when added to the laser transmitter inductance, is sufficiently small to enable the drive circuit to supply the laser transmitter with electrical power from the vehicle battery sufficient to cause the laser transmitter to transmit the jamming laser beam to the speed monitor.

2. The speed monitor disabling system of claim 1 wherein the drive circuit is structured to cause the jamming laser beam to include a plurality of pulses separated from each other by a time period that is less than an amount of time needed for the monitor laser beam to travel from the speed monitor to the moving vehicle and back to the speed monitor.

3. The speed monitor disabling system of claim 1 wherein the laser transmitter has an effective load impedance and the drive circuit includes a microstrip transmission line that supplies power to the laser transmitter and has a characteristic impedance substantially matching the effective load impedance of the laser transmitter.

4. The speed monitor disabling system of claim 3 wherein the microstrip transmission line includes a dielectric substrate coupled between a strip conductor and a ground plane, the strip conductor extending substantially across a face of the dielectric substrate.

5. The speed monitor disabling system of claim 1 wherein the drive circuit includes:

a pulse generator that generates a laser activation signal having a plurality of pulses; and a pulse driver circuit that amplifies the laser activation signal and transmits the amplified laser activation signal to the laser transmitter to cause the laser transmitter to transmit the jamming laser beam with a plurality of pulses, the pulse driver circuit including a plurality of power transistors and a plurality of energy storage elements structured to respond to the laser activation signal.

6. The speed monitor disabling system of claim 5 wherein each of the plurality of power transistors and energy storage elements is surface-mounted to a microstrip transmission line coupling the power transistors and energy storage elements to the laser transmitter.

7. The speed monitor disabling system of claim 1 wherein the laser detector, laser transmitter, and drive circuit form a first laser transponder, the disabling system further including:

an annunciator coupled to the first laser transponder, the annunciator providing a speed monitor warning to a user in response to sensing that the first laser transponder is transmitting the jamming laser beam.

8. The speed monitor disabling system of claim 7 wherein the annunciator includes first and second signal units for signaling users of the disabling system, the disabling system further including a second laser transponder substantially identical to the first laser transponder, the first and second laser transponders being positioned at different locations on the vehicle and being coupled to first and second signal units, respectively, the first signal unit signaling the user in response to a trigger signal from the first laser transponder and the second signal unit signaling the user in response to a trigger signal from the second laser transponder.

9. The speed monitor disabling system of claim 7 wherein the annunciator supplies power from the vehicle battery to the first laser transponder via a connection line and the annunciator includes a current sensor that senses the electrical current on the connection line and provides the speed monitor warning when the electrical current on the connection line indicates that the first laser transponder is transmitting the jamming laser beam.

10. The speed monitor disabling system of claim 9 wherein the laser transponder includes a thermistor coupled between the connection line and ground, the thermistor having an initial resistance value that enables the electrical current in the connection line to trigger the current sensor into temporarily providing the speed monitor warning in response to initially supplying power to the first laser transponder, the resistance value of the thermistor increasing, in response to continually supplying power to the first laser transponder, to a value that decreases the electrical current in the connection line to an amount that causes the current sensor to turn off the speed monitor detection warning.

11. A speed monitor disabling system for disabling a laser-based speed monitor, the speed monitor being of a type that transmits a monitor laser beam at a moving vehicle, receives a reflected laser beam from the moving vehicle, and determines the speed of the moving vehicle based on the time elapsed between transmitting the monitor laser beam and receiving the reflected laser beam, the moving vehicle including a vehicle battery, the disabling system comprising:

a laser detector positioned on the moving vehicle to detect the monitor laser beam transmitted by the speed monitor and transmit a detection signal in response to detecting the monitor laser beam;

a laser transmitter configured to transmit to the speed monitor a jamming laser beam substantially matching the monitor laser beam, the laser transmitter having a characteristic impedance; and a laser driver coupled to the laser detector, the laser driver structured to provide electrical power from the vehicle battery to the laser transmitter in response to receiving the detection signal from the laser detector, the laser driver including:

a microstrip transmission line having a characteristic impedance substantially matching the characteristic impedance of the laser transmitter and including a dielectric substrate coupled between a strip conductor and a ground plane, the strip conductor extending substantially across a face of the dielectric substrate; and a drive circuit mounted on the dielectric substrate, the drive circuit driving the laser transmitter via the microstrip transmission line in response to receiving the detection signal from the laser detector.

12. The speed monitor disabling system of claim 11 wherein the drive circuit is structured to cause the jamming laser beam to include a plurality of pulses separated from each other by a time period that is less than an amount of time needed for the monitor laser beam to travel from the speed monitor to the moving vehicle and back to the speed monitor.

13. The speed monitor disabling system of claim 11 wherein the moving vehicle includes a vehicle battery having an actual voltage of approximately eighteen volts or less and a nominal voltage of 12 volts, the laser transmitter has a characteristic inductance, and the laser driver has a drive inductance that when added to the laser transmitter inductance, is sufficiently small to allow the laser driver to supply the laser transmitter with electrical power from the vehicle battery sufficient to cause the laser transmitter to transmit the jamming laser beam to the speed monitor.

14. The speed monitor disabling system of claim 11 wherein the drive circuit includes:

a pulse generator that generates a laser activation signal having a plurality of pulses; and a pulse driver circuit that amplifies the laser activation signal and transmits the amplified laser activation signal to the laser transmitter via the microstrip transmission line to cause the laser transmitter to transmit the jamming laser beam.

15. The speed monitor disabling system of claim 14 wherein the pulse driver circuit includes a plurality of power transistors and energy storage elements structured to respond to the laser activation signal, each of the plurality of power transistors and energy storage elements being surface-mounted to the microstrip transmission line which couples the power transistors to the laser transmitter.

16. The speed monitor disabling system of claim 11 wherein the laser detector, laser transmitter, and laser driver form a first laser transponder, the disabling system further including:

an annunciator coupled to the first laser transponder, the annunciator providing a speed monitor warning to a user in response to sensing that the first laser transponder is transmitting the jamming laser beam.

17. The speed monitor disabling system of claim 16 wherein the annunciator includes first and second signal units for signaling users of the disabling system, the disabling system further including a second laser transponder substantially identical to the first laser transponder, the first and second laser transponders being positioned at different locations on the vehicle and being coupled to first and second signal units, respectively, the first signal unit signaling the user in response to a trigger signal from the first laser transponder and the second signal unit signaling the user in response to a trigger signal from the second laser transponder.

18. The speed monitor disabling system of claim 16 wherein the annunciator supplies power from the vehicle battery to the first laser transponder via a connection line and the annunciator includes a current sensor that senses the electrical current on the connection line and provides the speed monitor warning when the electrical current on the connection line indicates that the first laser transponder is transmitting the jamming laser beam.

19. The speed monitor disabling system of claim 18 wherein the laser transponder includes a thermistor coupled between the connection line and ground, the thermistor having an initial resistance value that enables the electrical current in the connection line to trigger the current sensor into temporarily providing the speed monitor warning in response to initially supplying power to the first laser transponder, the resistance value of the thermistor increasing, in response to continually supplying power to the first laser transponder, to a value that decreases the electrical current in the connection line to an amount that causes the current sensor to turn off the speed monitor detection warning.

20. A speed monitor disabling system for disabling a laser-based speed monitor, the speed monitor being of a type that transmits a monitor laser beam at a moving vehicle, receives a reflected laser beam from the moving vehicle, and determines the speed of the moving vehicle based on the time elapsed between transmitting the monitor laser beam and receiving the reflected laser beam, the moving vehicle including a vehicle battery, the disabling system comprising:

an annunciator coupled to the vehicle battery, the annunciator including a warning device that provides a user with a speed monitor warning that the monitor laser beam is being directed at the moving vehicle; and a first laser transponder positioned on the moving vehicle and coupled to the annunciator by a connection line, the annunciator providing power to the first laser transponder via the connection line, the first laser transponder being structured to detect the monitor laser beam transmitted by the speed monitor and transmit to the speed monitor a jamming laser beam substantially matching the monitor laser beam in response to detecting the monitor laser beam, the laser transponder including a test element coupled to the connection line, the test element triggering the annunciator into temporarily providing the speed monitor warning in response to the initial supply of power to the first laser transponder, the delay element causing the annunciator to turn off the speed monitor warning after an initial time period has elapsed.

21. The speed monitor disabling system of claim 20 wherein the annunciator includes a current sensor that senses the electrical current in the connection line and controls operation of the speed monitor warning, and the test element includes a thermistor coupled to the connection line, the thermistor having an initial resistance value that enables the electrical current in the connection line to cause the current sensor to temporarily turn on the speed monitor warning in response to the initial supply of power to the first laser transponder, the resistance value of the thermistor increasing, in response to further supply of power to the first laser transponder, to a value that decreases the electrical current in the connection line to an amount that causes the current sensor to turn off the speed monitor warning.

22. The speed monitor disabling system of claim 20 wherein the laser transponder is structured to cause the jamming laser beam to include a plurality of pulses separated from each other by a time period that is less than an amount of time needed for the monitor laser beam to travel from the speed monitor to the moving vehicle and back to the speed monitor.

23. The speed monitor disabling system of claim 20 wherein the vehicle battery has an actual voltage of approximately eighteen volts or less and a nominal voltage of 12 volts, the laser transponder includes a laser transmitter having a characteristic inductance and a laser driver having a drive inductance that, when added to the laser transmitter inductance, is sufficiently small to allow the laser driver to supply the laser transmitter with electrical power from the vehicle battery sufficient to cause the laser transmitter to transmit the jamming laser beam to the speed monitor.

24. The speed monitor disabling system of claim 23 wherein the laser transmitter has an effective load impedance and the drive circuit includes a microstrip transmission line having a characteristic impedance substantially matching the effective load impedance of the laser transmitter, the microstrip transmission line including a dielectric substrate positioned between a strip conductor and a ground plane, the strip conductor extending substantially across a face of the dielectric substrate.

25. The speed monitor disabling system of claim 24 wherein the microstrip transmission line has a characteristic impedance of approximately 0.3 to 3 ohms.

26. The speed monitor disabling system of claim 20 wherein the laser transponder includes:

a laser transmitter;

a pulse generator that generates a laser activation signal having a plurality of pulses; and a pulse driver circuit that amplifies the laser activation signal and transmits the amplified laser activation signal to the laser transmitter to cause the laser transmitter to transmit the jamming laser beam with a plurality of pulses, the pulse driver circuit including a plurality of power transistors to amplify the laser activation signal.

27. The speed monitor disabling system of claim 26 wherein each of the plurality of power transistors is surface-mounted to a microstrip transmission line coupling the power transistors to the laser transmitter.

28. The speed monitor disabling system of claim 20 wherein the annunciator includes first and second signal units for signaling users of the disabling system, the disabling system further including a second laser transponder substantially identical to the first laser transponder, the first and second laser transponders being positioned at different locations on the vehicle and being coupled to first and second signal units, respectively, the first signal unit transmitting the speed monitor warning in response to a trigger signal from the first laser transponder and the second signal unit transmitting the speed monitor warning in response to a trigger signal from the second laser transponder.

\* \* \* \* \*